United States Patent [19]
Iida

[11] Patent Number: 5,128,910
[45] Date of Patent: Jul. 7, 1992

[54] MAGNETOOPTICAL RECORDING METHOD AND APPARATUS USED THEREFOR

[75] Inventor: Haruhisa Iida, Tokyo, Japan
[73] Assignee: Nikon Corporation, Tokyo, Japan
[21] Appl. No.: 584,156
[22] Filed: Sep. 18, 1990

[30] Foreign Application Priority Data

Sep. 22, 1989 [JP] Japan .................. 1-247261

[51] Int. Cl.⁵ .............. G11B 11/12; G11B 13/04
[52] U.S. Cl. ........................ 369/13; 360/59; 360/64
[58] Field of Search .......... 369/13, 114, 47, 51; 360/114, 59; 365/122

[56] References Cited

U.S. PATENT DOCUMENTS

| | | | |
|---|---|---|---|
| 4,357,635 | 11/1982 | Hasegawa | 369/47 |
| 4,855,975 | 8/1989 | Akasaka | 360/59 |
| 4,938,915 | 7/1990 | Saito | 360/59 |
| 4,982,389 | 1/1991 | Nakao | 360/114 |

FOREIGN PATENT DOCUMENTS 3619618 12/1986 Fed. Rep. of Germany .
60-63773 4/1985 Japan .................. 369/59
62-175948 8/1987 Japan .

OTHER PUBLICATIONS

The Bell System Technical Journal, vol. 62, Sep. 1983, pp. 1923–1936.

Primary Examiner—Stuart S. Levy
Assistant Examiner—Michael Kessell
Attorney, Agent, or Firm—Shapiro and Shapiro

[57] ABSTRACT

In an over-write capable magnetooptical recording method and, more particularly, a bit position recording method, and a recording apparatus used therefor, a laser beam intensity is pulse-modulated between high and low levels according to data to be recorded. The modulated laser beam is radiated on a recording medium under the presence of a bias field. High-level emission time of the laser beam is shortened at the inner portion of the medium, and is prolonged at the outer portion. Low-level intensity of the laser beam is decreased at the inner portion of the medium, and is increased at the outer portion, thereby increasing C/N ratio upon reproduction.

4 Claims, 17 Drawing Sheets

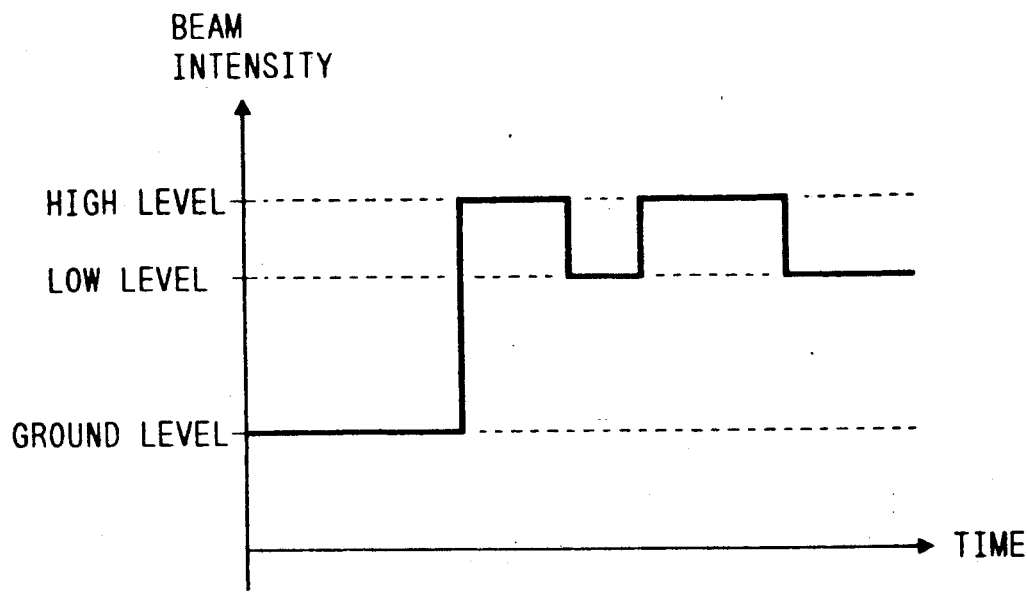

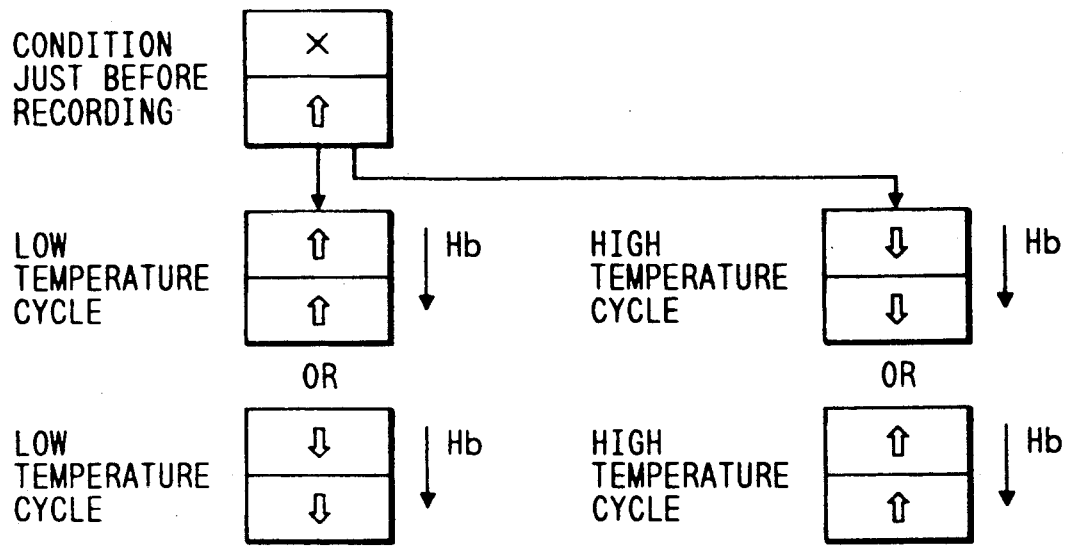
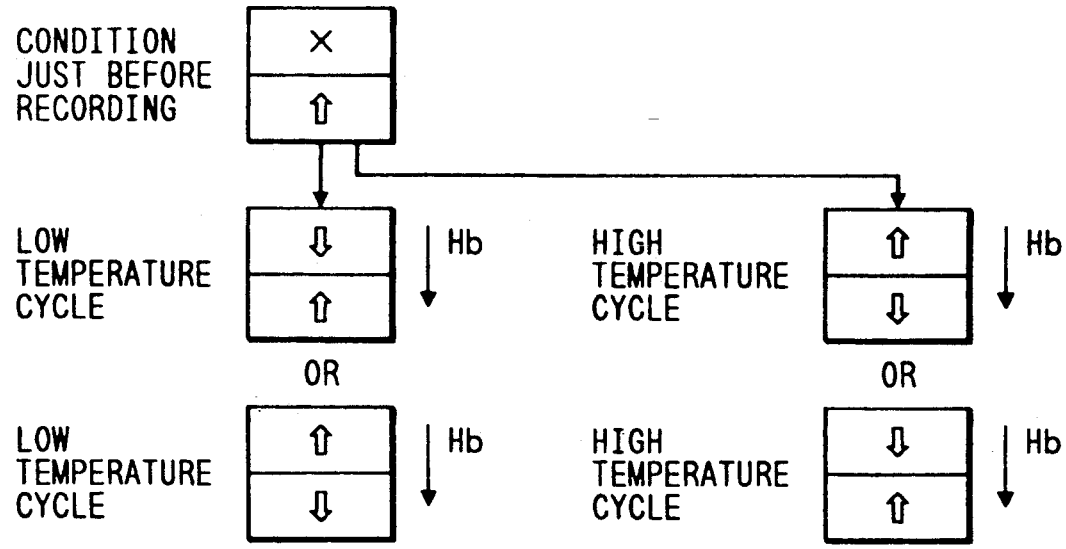

MAGNETOOPTICAL RECORDING METHOD AND APPARATUS USED THEREFOR

BACKGROUND OF THE INVENTION

1. Field of the Invention

The present invention relates to an over-write capable magnetooptical recording method and a recording apparatus used therefor.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, the magnetooptical recording/reproduction method is most attractive due to its unique advantages in that information can be erased after use and new information can be repetitively recorded/reproduced.

A recording medium used in the magnetooptical recording/reproduction method has a perpendicular magnetic anisotropy layer or layers as a recording layer. The magnetic layer comprises, for example, amorphous GdFe, GdCo, GdFeCo, TbFe, TbCo, TbFeCo, and the like. Concentric or spiral tracks are normally formed on the recording layer, and data is recorded on the tracks. In this specification, one of the "upward" and "downward" directions of the magnetization with respect to a film surface is defined as an "A direction", and the other one is defined as a "non-A direction". Data to be recorded is binarized in advance, and is recorded by two signals, i.e., a bit ($B_1$) having an "A-directed" magnetization, and a bit ($B_0$) having a "non-A-directed" magnetization. These bits $B_1$ and $B_0$ correspond to "1" and "0" levels of a digital signal, respectively.

In general, the direction of magnetization of the recording tracks can be aligned in the "non-A direction" by applying a strong bias field. This processing is called "initialization". Thereafter, a bit ($B_1$) having an "A-directed" magnetization may be formed on the tracks. Data is recorded in accordance with the presence/absence of the bit ($B_1$). A method of recording data in accordance with the presence/absence of the bit ($B_1$) is called "bit position recording".

Note that a pit representing a minimum data unit area is also called a bit or mark.

In order to re-use a recorded medium, (1) the entire medium must be re-initialized at one time by an initializing device, (2) an erase head having the same arrangement as a recording head (but the erase head applies a magnetic field in a direction opposite to the recording head) must be added to a recording apparatus, or (3) as preliminary processing, a non-modulated laser beam must be radiated on the medium after a bias field is reversed by the recording apparatus.

Therefore, in the conventional magnetooptical recording method, it is impractical to perform an over-write operation, which can desirably form bits ($B_0$) and ($B_1$) according to new data regardless of the presence/absence of recorded data.

If the direction of a bias field Hb can be desirably modulated between the "A-direction" and "non-A direction" in units of bits ($B_0$) and ($B_1$), an over-write operation is possible. However, it is impossible to modulate the bias field Hb at high speed, and so, high-speed recording as a feature of the magnetooptical recording cannot be performed.

A magnetooptical recording method capable of performing an over-write operation by only modulating a beam intensity according to data without modulating the bias field Hb, i.e., without turning on/off the bias field or changing its intensity is disclosed in Japanese Laid-Open Patent Application No. 62-175948. The basic principle of an over-write method will be described below on the basis of this invention.

In the following description, an exchange coupling force $\sigma_w$ is referred to as an interface wall energy.

In this method, a laser beam is pulse-modulated according to data. In this case, a characteristic feature of this method is an intensity level of a laser beam. A bit ($B_1$) having "A-directed" magnetization is formed at high level, and a bit ($B_0$) having "non-A-directed" magnetization is formed at low level.

Description of Basic Principle of Over-write Method

A medium used in this method has a multilayered structure consisting of a first layer having a perpendicular magnetic anisotropy and serving as a recording layer, and a second layer having a perpendicular magnetic anisotropy and serving as a reference layer. Only the direction of magnetization of the second layer is aligned in the "A direction" by an initial field Hini. immediately before recording while the direction of magnetization of the first layer is left unchanged.

When a laser beam which is pulse-modulated according to data between high and low levels is radiated on the medium, (1) in a state wherein a temperature is returned to a room temperature, a high-level laser beam forms a bit having "non-A-directed" magnetization in the second layer, and having the following direction of magnetization depending on a type of medium:

| | |
|---|---|
| "non-A direction" | P type |
| or "A-direction" | A type |

A "P type" medium is a medium in which the direction of magnetization is the same (parallel) in each of two layers. An "A type" medium is a medium in which the direction of magnetization of one layer is opposite (antiparallel) to the direction of magnetization of the other layer.

(2) in a state wherein a temperature is returned to a room temperature, a low-level laser beam forms a bit having "A-directed" magnetization in the second layer, and having the following direction of magnetization depending on a type of medium:

| | |
|---|---|
| "A-direction" | P type |
| or "non-A direction" | A type |

In this over-write method, only light is modulated according to data to be recorded, and a bias field is not modulated. It is difficult to modulate a magnetic field at high speed. More specifically, a laser beam used for recording is pulse-modulated according to data to be recorded. However, this procedure itself has been performed in the conventional magnetooptical recording method, and a means for pulse-modulating the beam intensity on the basis of two-valued or binary and serving as a recording layer, and a second layer having a perpendicular magnetic anisotropy and serving as a reference layer. Only the direction of magnetization of the second layer is aligned in the "A direction" by an initial field Hini. immediately before recording while the direction of magnetization of the first layer is left unchanged.

Another characteristic feature of this over-write method is high and low levels of a beam intensity. Assume that a laser beam which is pulse-modulated between high and low levels according to data is radiated on a medium.

(1) In a state wherein a medium temperature is increased to $T_H$ by a high-level laser beam, magnetization of both the first and second layers almost or completely disappears. When the beam radiation is stopped, and the medium temperature is decreased slightly below $T_{C2}$ ($\approx T_H$ or $<T_H$), the magnetization appears in the second layer.

At this time, the direction of magnetization of the second layer follows the direction of the bias field Hb, and is aligned in the same direction. This direction of magnetization of the second layer is left unchanged or is reversed when the medium temperature is returned to a room temperature. In the latter case, a compensation temperature $T_{comp.2}$ is present between the high medium temperature $T_H$ and the room temperature.

The magnetization of the first layer is controlled by the second layer. In this case, the direction of magnetization of the first layer is controlled by the second layer regardless of a positive or negative application direction of the bias field Hb. The second layer controls the direction of magnetization via an interface wall energy. As a result, a bit is formed having "non-A-directed" magnetization in the second layer and having the following direction of magnetization in the first layer, depending on a type of medium:

| "non-A direction" | P type |
|---|---|
| or "A direction" | A type |

(2) On the other hand, when the medium temperature is increased to a low temperature $T_L$ by a low-level laser beam, the direction of magnetization of the second layer is aligned in the "A direction" = the initialized direction, or in the "non-A direction". In the latter case, a compensation temperature $T_{comp.2}$ is present before the medium temperature reaches the low temperature $T_L$. In any case, stable magnetization is present in the second layer at $T_L$.

When the beam radiation is stopped and the medium temperature is decreased slightly below $T_{C1}$ ($<T_L$ or $\approx T_L$), magnetization appears in the first layer. In this case, the direction of magnetization of the first layer is controlled by the second layer regardless of a positive or negative application direction of the bias field Hb. The second layer controls the direction of magnetization of the first layer via an interface wall energy.

As a result, a bit having "A-directed" magnetization in the second layer, and having the following direction of magnetization depending on a type of medium in the first layer is formed:

| "A direction" | P type |
|---|---|
| or "non-A direction" | A type |

A beam need not always be a single beam but may be "two proximity beams". The first beam is turned on at low level and is not modulated, thereby always forming a bit having "non-A-directed" [or "A-directed"] magnetization, i.e., thereby erasing previous data. Then, the second beam is pulse-modulated between high level and level equivalent to low level or base level (including zero level) lower than low level according to data, so that a bit having "A-directed" [or "non-A-directed"] magnetization is formed only at high level, thereby recording data. FIG. 1 shows these beam intensities.

In any case, if required high and low levels, and base level, if necessary, are given, it is easy for those who are skilled in the art to modulate the beam intensity as described above by partially modifying a modulating means described in the above-mentioned reference, and the like.

Note that the "A-direction" means one of upward and downward directions with respect to a magnetic layer, and the other direction is called the "non-A direction".

If expressions ∘∘∘ [or △△△] appear, ∘∘∘ outside the parentheses in the first expression corresponds to ∘∘∘ in the subsequent expressions ∘∘∘ [or △△△], and vice versa.

An over-write capable medium is roughly classified into a first or second category. In either category, its sectional structure can be divided into two layers, as illustrated in FIG. 2A.

The first layer is a recording layer having a high coercivity at a room temperature and a low magnetization reversing temperature. The second layer has a low coercivity at a room temperature relative to the first layer, and a high magnetization reversing temperature. Note that each of the first and second layers themselves may comprise a multilayered structure.

When the coercivity of the first layer is represented by $H_{C1}$; that of the second layer, $H_{C2}$; a Curie temperature of the first layer, $T_{C1}$; that of the second layer, $T_{C2}$; a room temperature, $T_R$; a medium temperature obtained when a low-level laser beam is radiated, $T_L$; that obtained when a high-level laser beam is radiated, $T_H$; a coupling field applied to the first layer, $H_{D1}$; and a coupling field applied to the second layer, $H_{D2}$, a medium of the first category satisfies Formula 1 below, and satisfies Formulas 2 to 5 at the room temperature:

| | |
|---|---|
| $T_R < T_{C1} \approx T_L < T_{C2} \approx T_H$ | Formula 1 |
| $H_{C1} > H_{C2} + |H_{D1} \mp H_{D2}|$ | Formula 2 |
| $H_{C1} > H_{D1}$ | Formula 3 |
| $H_{C2} > H_{D2}$ | Formula 4 |
| $H_{C2} + H_{D2} < |Hini.| < H_{C1} \pm H_{D1}$ | Formula 5 |

In the above formulas, symbol "$\approx$" means "equal to" or "substantially equal to". In addition, of double signs $\pm$ and $\mp$, the upper sign corresponds to an A (antiparallel) type medium, and the lower sign corresponds to a P (parallel) type medium (these media will be described later). Note that a ferromagnetic medium belongs to a P type.

The relationship between coercivity and temperature is as shown in the graph of FIG. 3. A thin curve represents the characteristics of the first layer, and a bold curve represents those of the second layer.

Therefore, when an initial field (Hini.) is applied to this recording medium at the room temperature, the direction of magnetization of only the second layer is reversed without reversing that of the first layer according to Formula 5. When the initial field (Hini.) is applied to the medium before recording, the second layer can be magnetized in the "A direction (in the drawings, the "A direction" is indicated by an upward arrow ↑ , and the "non-A direction" is indicated by a downward arrow ↓ ). If the initial field Hini. becomes zero, the direction of the magnetization ↑ of the second layer can be left unchanged without being re-reversed according to Formula 4.

FIG. 2B schematically shows a state wherein only the reference layer is magnetized in the "A direction" ↑ immediately before recording.

The direction of magnetization * in the first layer represents previously recorded data. In the following description, since the direction of magnetization in the first layer does not change the basic operation mechanism, it is indicated by X. The diagram shown in FIG. 2B is modified as shown in Condition 1 in FIGS. 4 and 5 for the sake of simplicity.

In Condition 1, a high-level laser beam is radiated to increase a medium temperature to $T_H$. Since $T_H$ is higher than the Curie temperature $T_{C1}$, the magnetization of the first layer disappears. In addition, since $T_H$ is near the Curie temperature $T_{C2}$, the magnetization of the second layer also disappears completely or almost completely. The bias field (Hb) in the "A direction" or "non-A direction" is applied to the medium in accordance with a type of medium. The bias field (Hb) can be a stray field from the medium itself. For the sake of simplicity, assume that the bias field (Hb) in the "non-A direction" is applied to the medium. Since the medium is moving, a given irradiated portion is immediately separated from the laser beam, and is cooled by air. When the medium temperature is decreased under the presence of Hb, the direction of magnetization of the second layer is reversed to the "non-A direction" based on Hb (Condition $2_H$ in FIG. 4).

When the medium is further cooled and the medium temperature is decreased slightly below $T_{C1}$, magnetization of the first layer appears again. In this case, the direction of magnetization of the first layer is influenced by that of the second layer due to a magnetic coupling (exchange coupling) force. As a result, magnetization ↓ (the P type medium) or ↑ (the A type medium) is formed according to the type of medium (Condition $3_H$ in FIG. 4).

Condition $3_H$ may or may not be re-reversed depending on whether or not a compensation temperature $T_{comp.}$ is present when the medium temperature is decreased to the room temperature. As a result, Condition $3_H$ may be changed to Condition $4_H$ shown in FIG. 4.

A change in condition caused by the high-level laser beam is called high-temperature cycle herein.

Next, a low-level laser beam is radiated to increase the medium temperature to $T_L$. Since $T_L$ is near the Curie temperature $T_{C1}$, the magnetization of the first layer disappears completely or almost completely. However, since $T_L$ is lower than the Curie temperature $T_{C2}$, the magnetization of the second layer does not disappear (Condition $2_L$ in FIG. 5). In Condition $2_L$, although the bias field (Hb) is unnecessary, it cannot be turned on or off at high speed. Therefore, the bias field (Hb) is left applied inevitably.

However, since the $H_{C2}$ is kept high, the magnetization of the second layer will not be reversed by Hb. Since the medium is moving, a given irradiation portion is immediately separated from the laser beam, and is cooled by air. As cooling progresses, the magnetization of the first layer appears again. The direction of magnetization appearing in this case is influenced by that of the second layer due to the magnetic coupling force. As a result, ↑ (P type) or ↓ (A type) magnetization appears according to the type of medium (Condition $3_L$ in FIG. 5).

Condition $3_L$ may or may not be re-reversed depending on whether or not a compensation temperature $T_{comp.}$ is present when the medium temperature is decreased to the room temperature. As a result, Condition $3_L$ may be changed to Condition $4_L$ shown in FIG. 5.

A change in condition caused by the low-level laser beam is called a low-temperature cycle herein.

FIGS. 6A and 6B summarize the above description. Referring to FIGS. 6A and 6B, a bit having either one of the directions of magnetization ↑ and ↓ which are opposite to each other is formed in the high- and low-temperature cycles regardless of the direction of magnetization of the first layer. More specifically, an overwrite operation is enabled by pulse-modulating the laser beam between high level (high-temperature cycle) and low level (low-temperature cycle) in accordance with data to be recorded.

Note that the recording medium normally has a disk shape, and is rotated during recording. For this reason, a recorded portion (bit) is influenced again by the initial field Hini. during one revolution. As a result, the direction of magnetization of the second layer is aligned in the original "A direction" ↑. However, at the room temperature, the magnetization of the second layer can no longer influence that of the first layer, and the recorded data can be held.

If linearly polarized light is radiated on the first layer, since light reflected thereby includes data, the data can be reproduced as in the conventional magnetooptical recording medium.

A perpendicular magnetic film constituting each of the first and second layers is selected from the group consisting of (1) ferromagnetic and ferrimagnetic materials having no compensation temperature and having a Curie temperature, and (2) an amorphous or crystalline ferrimagnetic material having both the compensation temperature and the Curie temperature.

The first category which utilizes disappearance (including almost zero) of magnetization near the Curie temperature or higher has been described. In contrast to this, the second category utilizes decreased $H_C$ at a predetermined temperature higher than the room temperature. In other words, the direction of magnetization of a bit having the decreased $H_C$ is reversed by a large exchange coupling force or bias field in an opposite direction.

In a medium of the second category, substantially the same description can be applied except that a temperature $T_{S1}$ at which the first layer is magnetically coupled to the second layer is used in place of $T_{C1}$ in the medium of the first category, and a temperature $T_{S2}$ at which the direction of magnetization of the second layer is reversed under the influence of Hb is used in place of $T_{C2}$ regardless of the Curie temperature.

In the second category, when the coercivity of the first layer is represented by $H_{C1}$; that of the second layer, $H_{C2}$; a temperature at which the first layer is magnetically coupled to the second layer, $T_{S1}$; a temperature at which the magnetization of the second layer is reversed by Hb, $T_{S2}$; a room temperature, $T_R$; a medium temperature obtained when a low-level laser beam is radiated, $T_L$; that obtained when a high-level laser beam is radiated, $T_H$; a coupling field applied to the first layer, $H_{D1}$; and a coupling field applied to the second layer, $H_{D2}$, a medium of the first category satisfies Formula 6 below, and satisfies Formulas 7 to 10 at the room temperature:

$$T_R < T_{S1} \approx T_L < T_{S2} \approx T_H \quad \text{Formula 6}$$

$$H_{C1} > H_{C2} + |H_{D1} \mp H_{D2}| \quad \text{Formula 7}$$

$$H_{C1} > H_{D1} \quad \text{Formula 8}$$

$$H_{C2} > H_{D2} \quad \text{Formula 9}$$

$$H_{C2} + H_{D2} < |H_{ini.}| < H_{C1} \pm H_{D1} \quad \text{Formula 10}$$

In the above formulas, symbol "$\approx$" means "equal to" or "substantially equal to". In addition, of double signs $\pm$ and $\mp$, the upper sign corresponds to an A (antiparallel) type medium, and the lower sign corresponds to a P (parallel) type medium.

In both the first and second categories, the recording medium is preferably constituted by the first and second layers each of which comprises an amorphous ferrimagnetic material selected from transition metal (e.g., Fe, Co)-heavy rare earth metal (e.g., Gd, Tb, Dy, and the like) alloy compositions.

When the materials of both the first and second layers are selected from the transition metal-heavy rare earth metal alloy compositions, the direction and level of magnetization appearing outside the alloy are determined by the relationship between the direction and level of spin of transition metal atoms (to be abbreviated to as TM hereinafter) and those of heavy rare earth metal atoms (to be abbreviated to as RE hereinafter) inside the alloy. For example, the direction and level of TM spin are represented by a dotted vector ⁑, those of RE spin are represented by a solid vector ↑, and the direction and level of magnetization of the entire alloy are represented by a double-solid vector ⇑. In this case, the vector ⇑ is expressed as a sum of the vectors ⁑ and ↑. However, in the alloy, the vectors ⁑ and ↑ are directed in the opposite directions due to the mutual effect of the TM spin and the RE spin. Therefore, when these vectors are equal to each other, the sum of ⁑ and ↑ or the sum of ↓ and ⁑ is zero (i.e., the level of magnetization appearing outside the alloy becomes zero). The alloy composition making the sum of vectors zero is called a compensation composition. When the alloy has another composition, it has a strength equal to a difference between the strengths of the two spins, and has a vector (⇑ or ⇓) having a direction equal to that of the larger vector. Magnetization of this vector appears outside the alloy. For example, ↑⁑ appears as ⇑, and ↑⁑ appears as ⇓.

When one of the strengths of the vectors of the RE and TM spins is larger than the other, the alloy composition is referred to as "oo rich" named after the larger spin name (e.g., RE rich).

Both the first and second layers can be classified into TM rich and RE rich compositions. Therefore, as shown in FIG. 7, when the composition of the first layer is plotted along the ordinate and that of the second layer is plotted along the abscissa, the types of medium as a whole can be classified into four quadrants, as shown in FIG. 7. The P type medium described above belongs to Quadrants I and III, and the A type medium belongs to Quadrants II and IV. In FIG. 7, the intersection of the abscissa and the ordinate represents the compensation composition of the two layers.

In view of a change in coercivity against a change in temperature, a given alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature ($T_{comp.}$). No compensation temperature is present between the room temperature and the Curie temperature in the TM rich alloy composition. The compensation temperature below the room temperature is irrelevant in the magnetooptical recording, and hence, it is assumed in this specification that the compensation temperature is present between the room temperature and the Curie temperature.

If the first and second layers are classified in view of the presence/absence of the compensation temperature, the recording medium can be classified into four types. A medium in Quadrant I includes all the four types of media. FIGS. 8A to 8D show "graphs of the relationship between the coercivity and temperature" for the four types of media. Note that thin curves represent characteristics of the first layer, and bold curves represent those of the second layer.

When the first and second layers are classified in view of their RE or TM rich characteristics and in view of the presence/absence of the compensation temperature, recording media can be classified into the following nine classes.

TABLE 1

| | Quadrant I (P type) | | |
|---|---|---|---|
| Class | First Layer: RE Rich | Second Layer: TM Rich | Type |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |
| | Quadrant II (A type) | | |
| Class | First Layer: RE Rich | Second Layer: TM Rich | Type |
| 5 | $T_{comp.}$ | No $T_{comp.}$ | 3 |
| 6 | No $T_{comp.}$ | No $T_{comp.}$ | 4 |
| | Quadrant III (P type) | | |
| Class | First Layer: TM Rich | Second Layer: TM Rich | Type |
| 7 | No $T_{comp.}$ | No $T_{comp.}$ | 4 |
| | Quadrant IV (A type) | | |
| Class | First Layer: TM Rich | Second Layer: RE Rich | Type |
| 8 | No $T_{comp.}$ | $T_{comp.}$ | 2 |
| 9 | No $T_{comp.}$ | No $T_{comp.}$ | 4 |

Description of Principle of Over-Write Operation

The principle of an over-write operation will be described in detail below using a medium No. 1 belonging to Class 1 (P type, Quadrant I, Type 1) shown in Table 1.

The medium No. 1 satisfies Formula 11:

$$T_R < T_{comp.1} < T_L < T_H \lesssim T_{C1} \lesssim T_{C2} \quad \text{Formula 11}$$

and also satisfies Formula 11-2:

$$T_{comp.1} < T_{C1} \quad \text{Formula 11-2}$$

For the sake of simplicity, a medium having a relation of $T_H < T_{C1} < T_{C2}$ will be described below. The temperature $T_{comp.2}$ may be higher than, equal to, or lower than $T_L$. For the sake of simplicity, $T_{comp.2}$ is set to satisfy:

$$T_L < T_{comp.2}$$

FIG. 9 shows the above-mentioned relationship. Note that thin curves represent characteristics of the first layer, and bold curves represent those of the second layer. The same applies to the following graphs.

A condition that reverses the direction of magnetization of the second layer without reversing that of the first layer by the initial field Hini. at the room temperature $T_R$ is represented by Formula 12. This medium No. 1 satisfies Formula 12:

$$H_{C1} > H_{C2} + \frac{\sigma_w}{2M_{S1}t_1} + \frac{\sigma_w}{2M_{S2}t_2} \quad \text{Formula 12}$$

where
$H_{C1}$: coercivity of first layer
$H_{C2}$: coercivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy At this time, a condition for the field Hini. is represented by Formula 15. If the field Hini. disappears, the directions of magnetization of the first and second layers are influenced to each other due to the interface wall energy. The conditions that can hold the directions of magnetization of the first and second layers without being reversed are represented by Formulas 13 and 14. The medium No. 1 satisfies Formulas 13 and 14:

$$H_{C1} > \frac{\sigma_w}{2M_{S1}t_1} \quad \text{Formula 13}$$

$$H_{C2} > \frac{\sigma_w}{2M_{S2}t_2} \quad \text{Formula 14}$$

The magnetization of the second layer of the recording medium which satisfies conditions given by Formulas 12 to 14 at the room temperature is aligned in, e.g., the "A direction" ↑ (↑↓) by Hini. which satisfies following Formula 15 immediately before recording:

$$H_{C2} + \frac{\sigma_w}{2M_{S2}t_2} < |Hini.| < H_{C1} - \frac{\sigma_w}{2M_{S1}t_1} \quad \text{Formula 15}$$

At this time, the first layer is left in the previous recorded state (Condition 1a or 1b in FIG. 10 or 11).

Note that in FIG. 10 and subsequent drawings, of lines dividing the first and second layers, a bold line represents a magnetic wall.

Conditions 1a and 1b are held immediately before recording.

Assume that the bias field Hb is applied in the "A direction" ↑.

Note that it is difficult to focus the bias field Hb to the same range as a radiation region (spot region) of the laser beam as well as normal magnetic fields. When a medium has a disk shape, recorded data (bit) is influenced by the field Hini. during one revolution, and Condition 1a or 1b appears again. The bit passes a portion near the laser beam radiation region (spot region). At this time, the bit in Condition 1a or 1b is influenced by a bias field Hb applying means since the bit approaches it. In this case, if the direction of magnetization of the first layer of the bit in Condition 1a having the direction of magnetization opposite to that of Hb is reversed by Hb, data which has been recorded one revolution before is lost. A condition for preventing this is given by:

$$H_{C1} > Hb + \frac{\sigma_w}{2M_{S1}t_1} \quad \text{Formula 15-2}$$

The disk-like medium must satisfy this formula at the room temperature. In other words, a condition for determining Hb is expressed by Formula 15-2.

The bit in Condition 1a or 1b then reaches the spot region of the laser beam. The laser beam intensity includes two levels, i.e., high and low levels.

The low-temperature cycle will be described below with reference to FIG. 10.

Low-Temperature Cycle

A low-level laser beam is radiated on a bit in Condition 1a or 1b, and a medium temperature is increased beyond $T_{comp.1}$. Thus, the medium type is shifted from P type to A type. Although the directions of the RE and TM spins of the first layer are left unchanged, the relationship between their strengths is reversed. As a result, the direction of magnetization of the first layer is reversed (Condition 1a→ Condition $2_{La}$, Condition 1b→Condition $2_{Lb}$ in FIG. 9).

The laser beam is kept radiating, and the medium temperature then reaches $T_L$. Thus, the following relation is established:

$$H_{C1} + Hb < \frac{\sigma_w}{2M_{S1}t_1}.$$

Even if Hb ↑ is present, Condition $2_{La}$ transits to Condition $3_L$. Meanwhile, since Condition $2_{Lb}$ remains the same regardless of Hb ↑, it becomes the same Condition $3_L$.

In this state, when the bit falls outside the spot region of the laser beam, the medium temperature begins to be decreased. When the medium temperature is decreased below $T_{comp.1}$, the medium type is restored from A type to original P type. The relationship between the strengths of the RE and TM spins of the first layer is reversed (↑↓→↑↓). As a result, the direction of magnetization o the first layer is reversed to the "A direction" ↑ (Condition $4_L$).

Condition $4_L$ is held even when the medium temperature is decreased to the room temperature.

As a result, a bit in the "A direction" ↑ is formed in the first layer.

The high-temperature cycle will be described below with reference to FIG. 11.

High-temperature Cycle

When a high-level laser beam is radiated on a bit in Condition 1a or 1b before recording, the medium temperature is increased to the low temperature $T_L$ via $T_{comp.1}$. As a result, the same Condition $2_H$ as Condition $3_L$ is established.

Upon radiation of the high-level laser beam, the medium temperature is further increased. When the medium temperature exceeds $T_{comp.2}$ of the second layer, the medium type is shifted from A type to P type. Although the directions of the RE and TM spins of the second layer are left unchanged, the relationship between their strengths is reversed ($\uparrow\Downarrow \rightarrow \uparrow\Uparrow$). For this reason, the direction of magnetization of the second layer is reversed, i.e., the "non-A-directed" $\Downarrow$ magnetization is attained (Condition $3_H$).

However, since $H_{C2}$ is still large at this temperature, the magnetization of the second layer will not be reversed by $\uparrow$ Hb. When the medium temperature is further increased and reaches $T_H$, the coercivities of the first and second layers are decreased since $T_H$ is near the Curie temperature. As a result, the medium satisfies one of the following formulas:

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are reversed at almost the same time, and follow the direction of Hb. This condition corresponds to Condition $4_H$.

When the bit falls outside the spot region of the laser beam in this condition, the medium temperature begins to fall. When the medium temperature is decreased below $T_{comp.2}$, the medium type is shifted from P type to A type. Although the directions of the RE and TM spins of the second layer are left unchanged, the relationship between their strengths is reversed ($\downarrow\Downarrow \rightarrow \downarrow\Uparrow$). As a result, the direction of magnetization of the second layer is reversed, i.e., from $\uparrow$ to the "non-A direction"$\Downarrow$ (Condition $5_H$).

When the medium temperature is further decreased from the temperature in Condition $5_H$ below $T_{comp.1}$, the medium type is restored from A type to original P type. The relationship between their strengths is then reversed ($\downarrow\Uparrow \rightarrow \downarrow\Downarrow$). As a result, the direction of magnetization of the first layer is reversed to the "non-A direction" $\Downarrow$ (Condition $6_H$).

The medium temperature is then decreased from the temperature in Condition $6_H$ to the room temperature. Since $H_{C1}$ at the room temperature is sufficiently large (Formula 15-3), the magnetization $\Downarrow$ of the first layer will not be reversed by $\uparrow$ Hb, and Condition $6_H$ is maintained.

$$Hb < H_{C1} + \frac{\sigma_w}{2M_{S1}t_1} \quad \text{Formula 15-3}$$

In this manner, a bit in the "non-A direction" $\Downarrow$ is formed in the first layer.

The principle of the over-write method will be described below using a specific medium No. 2 belonging to a recording medium of Class 2 (P type, Quadrant I, and Type 2) shown in Table 1.

The medium No. 2 has a relation given by Formula 16:

$$T_R < T_{C1} \approx T_L \approx T_{comp.2} < T_{C2} \approx T_H \quad \text{Formula 16}$$

FIG. 12 shows this relation as a graph.

A condition for reversing only the direction of magnetization of the second layer by the initial field Hini. without reversing that of the first layer is given by Formula 17:

$$H_{C1} > H_{C2} + \frac{\sigma_w}{2M_{S1}t_1} + \frac{\sigma_w}{2M_{S2}t_2} \quad \text{Formula 17}$$

where
$H_{C1}$: coercivity of first layer
$H_{C2}$: coercivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy In this case, a condition for Hini. is given by Formula 20. When Hini. disappears, the reversed magnetization of the second layer is influenced by that of the first layer due to the exchange coupling force. Conditions for holding the magnetization of the second layer without being re-reversed are given by Formulas 18 and 19. The medium No. 2 satisfies Formulas 18 and 19.

$$H_{C1} > \frac{\sigma_w}{2M_{S1}t_1} \quad \text{Formula 18}$$

$$H_{C2} > \frac{\sigma_w}{2M_{S2}t_2} \quad \text{Formula 19}$$

$$H_{C2} + \frac{\sigma_w}{2M_{S2}t_2} < |Hini.| < H_{C1} - \frac{\sigma_w}{2M_{S1}t_1} \quad \text{Formula 20}$$

Magnetization of the second layer of the recording medium which satisfies Conditions given by Formulas 17 to 19 at the room temperature is aligned in, e.g., the "A direction" $\uparrow$ ($\uparrow\Uparrow$) by Hini. satisfying Formula 20 immediately before recording. In this case, the first layer is left in a recorded state (Condition 1 in FIGS. 13 and 14).

This Condition 1 is maintained immediately before recording. In this case, the bias field (Hb) is in the "direction" $\uparrow$.

For the above-mentioned medium, the low-temperature cycle will be described below with reference to FIG. 13.

Low-temperature Cycle

A low-level laser beam is radiated on a bit in Condition 1 to increase the medium temperature to $T_L$. Since $T_L$ is almost equal to the Curie temperature $T_{C1}$ of the first layer, its magnetization disappears (Condition $2_L$).

In Condition $2_L$, when the bit falls outside the spot region of the laser beam, the medium temperature begins to be decreased. When the medium temperature is decreased slightly below $T_{C1}$, RE and TM spins (⇅) of the second layer influence those of the first layer due to the exchange coupling force. That is, a force for aligning RE spins themselves ( ↑ ) and TM spins themselves (⇊) acts. As a result, magnetization ⇅, i e., ⇑ appears in the first layer (Condition $3_L$). Condition $3_L$ is not changed even when the medium temperature is further decreased. As a result, a bit in the "A direction" ⇑ is formed in the first layer.

A high-temperature cycle will b described below with reference to FIG. 14.

High-temperature Cycle

When a high-level laser beam is radiated on a bit in Condition 1 before recording to increase the medium temperature to $T_L$, since $T_L$ is almost equal to the Curie temperature $T_{C1}$ of the first layer, its magnetization disappears (Condition $2_H$ = Condition $2_L$).

When beam radiation is further continued, the medium temperature is further increased. When the medium temperature slightly exceeds $T_{comp.2}$ of the second layer, the relationship between the strengths of RE and TM spins is reversed (⇅→⇵) although their directions are left unchanged. For this reason, the magnetization of the entire alloy is reversed to the "non-A direction" ⇓ (Condition $3_H$).

However, since $H_{C2}$ is still large at this temperature, the magnetization of the second layer will not be reversed by ↑ Hb. When the temperature is further increased and reaches $T_H$, the temperature of the second layer becomes almost equal to the Curie temperature $T_{C2}$, and its magnetization disappears (Condition $4_H$).

When the bit falls outside the spot region of the laser beam in Condition $4_H$, the medium temperature begins to fall. When the medium temperature is decreased slightly below $T_{C2}$, magnetization appears in the second layer. In this case, magnetization ↑ (⇊) appears due to ↑ Hb. However, since the temperature is still higher than $T_{C1}$, no magnetization appears in the first layer. This condition corresponds to Condition $5_H$.

When the medium temperature is further decreased below $T_{comp.2}$, the relationship between the strengths of RE and TM spins is reversed (⇵→⇅) although their directions are left unchanged. As a result, the magnetization of the entire alloy is reversed from ↑ to the "non-A direction" ⇓ (Condition $6_H$).

In Condition $6_H$, since the medium temperature is still higher than $T_{C1}$, the magnetization of the first layer still disappears. In addition, since $H_{C2}$ at this temperature is large, the magnetization of the second layer will not be reversed by ↑ Hb.

When the temperature is further decreased slightly below $T_{C1}$, magnetization appears in the first layer. In this case, the exchange coupling force from the second layer acts to align the RE spins themselves ( ↓ ) and TM spins themselves (⇡). For this reason, magnetization ⇵, i.e., ⇓ appears in the first layer. This condition corresponds to Condition $7_H$.

The medium temperature is then decreased from the temperature in Condition $7_H$ to the room temperature. Since $H_{C1}$ at the room temperature is sufficiently large, the magnetization of the first layer will not be reversed by ↑ Hb, and Condition $7_H$ can be maintained. Thus, a bit in the "non-A direction" is formed.

The principle of the over-write operation will be described in detail below using a specific medium No. 3 belonging to a recording medium of Class 3 (P type, Quadrant I, Type 3) shown in Table 1.

This medium No. 3 has a relation given by Formula 21:

$$T_R < T_{comp.1} < T_{C1} \approx T_L < T_{C2} \approx T_H \qquad \text{Formula 21}$$

FIG. 15 shows this relation as a graph.

A condition for reversing only the magnetization of the second layer by the initial field Hini. without reversing that of the first layer is given by Formula 22. This medium No. 3 satisfies Formula 22:

$$H_{C1} > H_{C2} + \frac{\sigma_w}{2M_{S1}t_1} + \frac{\sigma_w}{2M_{S2}t_2} \qquad \text{Formula 22}$$

where $H_{C1}$: coercivity of first layer
$H_{C2}$: coercivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy In this case, a condition for Hini. is represented by Formula 25. When Hini. disappears, the reversed magnetization of the second layer is influenced by that of the first layer due to the exchange coupling force. Conditions for maintaining the magnetization of the second layer without being re-reversed are given by Formulas 23 and 24. This medium No. 3 satisfies Formulas 23 and 24:

$$H_{C1} > \frac{\sigma_w}{2M_{S1}t_1} \qquad \text{Formula 23}$$

$$H_{C2} > \frac{\sigma_w}{2M_{S2}t_2} \qquad \text{Formula 24}$$

$$H_{C2} + \frac{\sigma_w}{2M_{S2}t_2} < |Hini.| < H_{C1} - \frac{\sigma_w}{2M_{S1}t_1} \qquad \text{Formula 25}$$

Magnetization of the second layer of the recording medium which satisfies the conditions given by Formulas 22 to 24 at the room temperature is aligned in, e.g., the "A direction" ⇑ (⇅) by Hini. satisfying a condition given by Formula 25 immediately before recording. In this case, the first layer is left in the recorded state (Condition 1 in FIGS. 16 and 17).

This Condition 1 is held immediately before recording. In this case, the bias field (Hb) is applied in a direction of ↓.

A low-temperature cycle will be described below with reference to FIG. 16.

Low-temperature Cycle

A low-level laser beam is radiated on a bit in Condition 1 to increase the medium temperature to $T_L$. Since $T_L$ is almost equal to the Curie temperature $T_{C1}$ of the first layer, its magnetization disappears. However, since the $H_{C2}$ of the second layer is still large at this temperature, its magnetization will not be reversed by ↓ Hb (Condition $2_L$).

When the bit falls outside the spot region of the laser beam in Condition $2_L$, the medium temperature begins to fall. When the medium temperature is slightly decreased below $T_{C1}$, the RE and TM spins (↑⁝) of the second layer influences those of the first layer due to the exchange coupling force. More specifically, a force for aligning RE spins themselves (↑) and TM spins themselves (⁝) acts. As a result, magnetization ↑⁝, i.e., ↓ appears in the first layer. In this case, since the temperature is beyond $T_{comp.1}$, the TM spin becomes larger (Condition $3_L$).

When the medium temperature is decreased below $T_{comp.1}$, the relationship between the strengths of the RE and TM spins of the first layer is reversed like in the high-temperature cycle (↑⁝→↑⁝). As a result, the magnetization of the first layer overcomes ↓ Hb and is aligned in ↑ (Condition $4_L$).

This Condition $4_L$ is held even when the medium temperature is decreased to the room temperature. As a result, a bit in the "A direction" ↑ is formed.

A high-temperature cycle will be described below with reference to FIG. 17.

High-temperature Cycle

When a high-level laser beam is radiated on a bit in Condition 1 before recording to increase the medium temperature to $T_L$, since $T_L$ is almost equal to the Curie temperature $T_{C1}$ of the first layer, its magnetization disappears (Condition $2_H$ = Condition $2_L$).

When the beam radiation further continues and the medium temperature reaches $T_H$, since $T_H$ is almost equal to $T_{C2}$ of the second layer, its magnetization also disappears (Condition $3_H$).

When the bit falls outside the spot region of the laser beam in Condition $3_H$, the medium temperature begins to fall. When the medium temperature is decreased slightly below $T_{C2}$, magnetization appears in the second layer. In this case, magnetization ↓ (↓⁝) appears due to ↓ Hb. However, since the temperature is still higher than $T_{C1}$, no magnetization appears in the first layer. This condition corresponds to Condition $4_H$.

When the medium temperature is further decreased slightly below $T_{C1}$, magnetization also appears in the first layer. In this case, the magnetization of the second layer influences that of the first layer due to the exchange coupling force. As a result, a force for aligning RE spins themselves (↓) and TM spins (⁝) themselves acts. In this case, since the medium temperature is equal to or higher than $T_{comp.1}$, the TM spins are larger than RE spins (↓⁝). As a result, magnetization ↓ appears in the second layer (Condition $5_H$).

When the medium temperature is further decreased from the temperature in Condition $5_H$ below $T_{comp.1}$, the relationship between the strengths of the TM and RE spins of the first layer is reversed (↓⁝→↓⁝). For this reason, the direction of magnetization of the first layer is reversed to the "non-A direction" (Condition $6_H$).

The medium temperature is then decreased from the temperature in Condition $6_H$ to the room temperature, Since $H_{C1}$ at the room temperature is sufficiently large, the magnetization of the first layer is stably held. Thus, a bit in the "non-A direction" is formed.

The principle of the over-write operation will be described in detail below using a specific medium No. 4 belonging to a recording medium of Class 4 (P type, Quadrant I, Type 4) shown in Table 1.

This medium No. 3 has a relation given by Formula 26:

$$T_R < T_L < T_H \lesssim T_{C1} \lesssim T_{C2} \qquad \text{Formula 26}$$

For the sake of simplicity, $T_H < T_{C1} < T_{C2}$ in the following description. FIG. 18 shows this relation as a graph.

A condition for reversing only the direction of magnetization of the second layer by the initial field Hini. at the room temperature $T_R$ without reversing that of the first layer is represented by Formula 27. The medium No. 4 satisfies Formula 27:

$$H_{C1} > H_{C2} + \frac{\sigma_w}{2M_{S1}t_1} + \frac{\sigma_w}{2M_{S2}t_2} \qquad \text{Formula 27}$$

In this case, a condition for Hini. is represented by Formula 30. When Hini. disappears, the directions of magnetization of the first and second layers are influenced by the exchange coupling force. Conditions for maintaining the directions of magnetization of the first and second layers without being reversed are given by Formulas 28 and 29. This medium No. 4 satisfies Formulas 28 and 29:

$$H_{C1} > \frac{\sigma_w}{2M_{S1}t_1} \qquad \text{Formula 28}$$

$$H_{C2} > \frac{\sigma_w}{2M_{S2}t_2} \qquad \text{Formula 29}$$

The magnetization of the second layer of the recording medium which satisfies the conditions given by Formulas 27 to 29 at the room temperature is aligned in, e.g., the "A direction" ↑ (↑⁝) by Hini. which satisfies Formula 30 immediately before recording:

$$H_{C2} + \frac{\sigma_w}{2M_{S2}t_2} < |Hini.| < H_{C1} - \frac{\sigma_w}{2M_{S1}t_1} \qquad \text{Formula 30}$$

At this time, the first layer is left in the recorded state (Condition 1a or 1b in FIGS. 19 and 20). Condition 1a or 1b is maintained immediately before recording.

The recording magnetic field Hb is assumed to be applied in the "non-A direction" ↓.

When the medium has a disk shape, a condition for inhibiting magnetization of a recorded bit (in particular, a bit in Condition 1b in which the direction of magnetization of the first layer is opposite to the direction of Hb) from being reversed by Hb when it approaches an Hb apply means is represented by Formula 30-2:

$$Hb < H_{c1} + \frac{\sigma_w}{2M_{S1}t_1} \qquad \text{Formula 30-2}$$

The disk medium must satisfy this Formula at the room temperature. A condition for inhibiting the initialized second layer from being reversed by Hb when it approaches the Hb applying mean is represented by Formula 30-3:

$$Hb < H_{C2} - \frac{\sigma_w}{2M_{S2}t_2} \qquad \text{Formula 30-3}$$

In other words, conditions for determining Hb are Formulas 30-2 and 30-3.

A bit in Condition 1a or 1b then reaches the spot region of the laser beam. The laser beam intensity includes two, i.e., high and low levels like in the basic invention.

A low-temperature cycle will be described below with reference to FIG. 19.

Low-temperature Cycle

A low-level laser beam is radiated on a bit in Condition 1a or 1b, and the medium temperature is increased to $T_L$. Thus, a condition which can satisfy the following relation is established, and Condition 1a transits to Condition $2_L$:

$$H_{C1} + Hb < \frac{\sigma_w}{2M_{S1}t_1}$$

On the other hand, since Condition 1b is left unchanged, it becomes the same Condition $2_L$.

In Condition $2_L$, when the bit falls outside the spot region of the laser beam, the medium temperature begins to be decreased.

Even when the medium temperature is decreased to the room temperature, Condition $2_L$ is maintained since its $H_{C1}$ at the room temperature is sufficiently large (see Formula 30-4).

$$Hb < H_{C1} + \frac{\sigma_w}{2M_{S1}t_1} \qquad \text{Formula 30-4}$$

As a result, a bit in the "A direction" ↑ is formed in the first layer.

A high-temperature cycle will be described below with reference to FIG. 20.

High-temperature Cycle

When a high-level laser beam is radiated on a bit in Condition 1 or 2 before recording, the medium temperature is increased to the low temperature $T_L$. As a result, Condition $2_H$ equal to Condition $2_L$ in the low-temperature cycle is established.

When the beam radiation continues and the medium temperature is further increased up to $T_H$, the coercivity is decreased since $T_H$ approaches the Curie temperatures of the first and second layers. As a result, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \qquad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \qquad (2)$$

and $$Hb > H_{C2} - \frac{\sigma_w}{2M_{S2}t_2}$$

$$Hb > H_{C1} - \frac{\sigma_w}{2M_{S1}t_1} \qquad (3)$$

and $$Hb > H_{C2} + \frac{\sigma_w}{2M_{S2}t_2}$$

For this reason, the directions of magnetization of the two layers are almost simultaneously reversed to follow the direction of Hb. This condition corresponds to Condition $3_H$.

When the bit falls outside the spot region of the laser beam in Condition $3_H$, the medium temperature is begins to be decreased. The medium temperature is then decreased to the room temperature. However, Condition $3_H$ is left unchanged.

Thus, a bit in the "non-A direction" ↓ formed in the first layer.

The principle of the over-write method will be described in detail below using a medium No. 5 belonging to a recording medium of Class 5 (A type, Quadrant II, Type 3) shown in Table 1.

This medium No. 5 has a relation given by Formula 31:

$$T_R < T_{comp.1} < T_L < T_H \lesssim T_{C1} \lesssim T_{C2} \qquad \text{Formula 31}$$

For the sake of simplicity, $T_H < T_{C1} < T_{C2}$ in the following description. FIG. 21 shows this relation as a graph.

A condition for reversing only the direction of magnetization of the second layer by the initial field Hini. at the room temperature $T_R$ without reversing that of the first layer is represented by Formula 32. This medium No. 5 satisfies Formula 32:

$$H_{C1} > H_{C2} + \left| \frac{\sigma_w}{2M_{S1}t_1} - \frac{\sigma_w}{2M_{S2}t_2} \right| \qquad \text{Formula 32}$$

In this case, a condition for Hini. is represented by Formula 32. When Hini. disappears, the directions of magnetization of the first and second layer are influenced to each other due to the interface wall energy. Conditions for maintaining the directions of magnetization of the first and second layers without being reversed are represented by Formulas 33 and 34. This medium No. 5 satisfies Formulas 33 and 34:

$$H_{C1} > \frac{\sigma_w}{2M_{S1}t_1} \qquad \text{Formula 33}$$

$$H_{C2} > \frac{\sigma_w}{2M_{S2}t_2} \qquad \text{Formula 34}$$

Magnetization of the second layer of the recording medium which satisfies the conditions given by Formulas 32 to 34 at the room temperature is aligned in, e.g., the "A direction" ↑ (↓?) by Hini. which satisfies Formula 35 immediately before recording:

$$H_{C2} + \frac{\sigma_w}{2M_{S2}t_2} < |Hini.| < H_{C1} + \frac{\sigma_w}{2M_{S1}t_1} \qquad \text{Formula 35}$$

At this time, the first layer is left in the recorded state (Condition 1a or 1b in FIGS. 22 and 23). This Condition 1a or 1b is maintained immediately before recording.

The bias field Hb is assumed to be applied in the "non-A direction" ↓.

When the medium has a disk shape, a condition for inhibiting magnetization of a recorded bit (in particular, a bit in Condition 1b in which the direction of magnetization of the first layer is opposite to the direction of Hb) from being reversed by Hb when it approaches an Hb applying means is represented by Formula 35-2:

$$Hb < H_{C1} - \frac{\sigma_w}{2M_{S1}t_1} \qquad \text{Formula 35-2}$$

The disk medium must satisfy this formula at the room temperature. A condition for inhibiting the initialized second layer from being reversed by Hb when it approaches the Hb applying means is represented by Formula 35-3:

$$Hb < H_{C2} - \frac{\sigma_w}{2M_{S2}t_2} \qquad \text{Formula 35-3}$$

In other words, conditions for determining Hb are Formulas 35-2 and 35-3.

A bit in Condition 1a or 1b then reaches the spot region of the laser beam. The laser beam intensity includes two, i.e., high and low levels.

A low-temperature cycle will be described below with reference to FIG. 22.

Low-temperature Cycle

A low-level laser beam is radiated on a bit in Condition 1a or 1b, and the medium temperature is increased beyond $T_{comp.1}$. The medium type is changed from A type to P type. The relationship between the strengths of the RE and TM spins of the first layer is reversed although their directions are left unchanged. For this reason, the direction of magnetization of the first layer is reversed (Condition 1a→Condition $2_{La}$, Condition 1b→Condition $2_{Lb}$).

When the medium temperature is further increased from this state up to $T_L$, the following formula is satisfied:

$$H_{C1} + Hb < \frac{\sigma_w}{2M_{S1}t_1}$$

Thus, Condition $2_{La}$ transmits to Condition $3_L$. Meanwhile, since condition $2_{Lb}$ is left unchanged, it becomes the same Condition $3_L$.

When the bit falls outside the spot region of the laser beam in this condition, the medium temperature begins to be decreased. When the medium temperature is decreased below $T_{comp.1}$, the medium type is restored from P type to original A type. The relationship between the strengths of RE and TM spins of the first layer is reversed (↓↑→↓↑). As a result, the direction of magnetization of the first layer is reversed to the "non-A direction" ↓. This condition corresponds to Condition $4_L$.

The medium temperature is then decreased to the room temperature, and Condition $4_L$ is maintained.

As a result, a bit in the "non-A direction" ↓ is formed in the first layer.

A high-temperature cycle will be described below with reference to FIG. 23.

High-temperature Cycle

When a high-level laser beam is radiated on a bit in Condition 1a or 1b before recording, the medium temperature is increased to the low temperature $T_L$ via $T_{comp.1}$. As a result, Condition $2_H$ equal to Condition $2_L$ is established.

The beam radiation continues and the medium temperature then reaches $T_H$. The coercivities of the two layers are decreased since $T_H$ approaches the Curie temperatures of the first and second layers. As a result, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \qquad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \qquad (2)$$

and $$Hb > H_{C2} - \frac{\sigma_w}{2M_{S2}t_2}$$

$$Hb > H_{C1} - \frac{\sigma_w}{2M_{S1}t_1} \qquad (3)$$

and $$Hb > H_{C2} + \frac{\sigma_w}{2M_{S2}t_2}$$

For this reason, the directions of magnetization of the two layers are almost simultaneously reversed to follow the direction of Hb. This condition corresponds to Condition $3_H$.

When the bit falls outside the spot region of the laser beam in Condition $3_H$, the medium temperature begins to be decreased.

When the medium temperature is decreased below $T_{comp.1}$, the medium type is restored from P type to original A type. The relationship between the strengths of TM and RE spins of the first layer is reversed (↑↓→↑↓). For this reason, the direction of magnetization of the first layer is reversed to the "A direction" ↑ (Condition $4_H$).

The medium temperature is decreased from the temperature in Condition $4_H$ to the room temperature. $H_{C1}$ at the room temperature is sufficiently large, and Formula 35-4 is satisfied:

$$Hb < H_{C1} + \frac{\sigma_w}{2M_{S1}t_1} \qquad \text{Formula 35-4}$$

Therefore, the magnetization of the first layer is stably maintained in Condition $4_H$.

Thus, a bit in the "A direction" is formed in the first layer.

The principle of the over-write method will be described in detail below using a medium No. 6 belonging to a recording medium of Class 6 (A type, Quadrant II, Type 4) shown in Table 1.

This medium No. 6 has a relation given by Formula 36:

$$T_R < T_{C1} \approx T_L < T_{C2} \approx T_H \qquad \text{Formula 36}$$

FIG. 24 shows this relation as a graph.

A condition for reversing only the direction of magnetization of the second layer by the initial field Hini. at the room temperature $T_R$ without reversing that of the first layer is represented by Formula 37. This medium No. 6 satisfies Formula 37:

$$H_{C1} > H_{C2} + \left| \frac{\sigma_w}{2M_{S1}t_1} - \frac{\sigma_w}{2M_{S2}t_2} \right| \qquad \text{Formula 37}$$

where
$H_{C1}$: coercivity of first layer
$H_{C2}$: coercivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy A condition for Hini. at this time is given by Formula 40. When Hini. disappears, the reversed magnetization of the second layer is influenced by that of the first layer due to the exchange coupling force. Conditions for holding the magnetization of the second layer without being re-reversed are given by Formulas 38 and 39. This medium No. 6 satisfies Formulas 38 and 39:

$$H_{C1} > \frac{\sigma_w}{2M_{S1}t_1} \qquad \text{Formula 38}$$

$$H_{C2} > \frac{\sigma_w}{2M_{S2}t_2} \qquad \text{Formula 39}$$

$$H_{C2} + \frac{\sigma_w}{2M_{S2}t_2} < |Hini.| < H_{C1} + \frac{\sigma_w}{2M_{S1}t_1} \qquad \text{Formula 40}$$

The magnetization of the second layer of the recording medium which satisfies the conditions given by Formulas 37 to 39 at the room temperature is aligned in, e.g. the "A direction" ↑ (↓↑) by Hini. which satisfies the condition given by Formula 40 immediately before recording. At this time, the first layer is kept in the recorded state (Condition 1 in FIGS. 25 and 26). Condition 1 is maintained immediately before recording. In this case, the bias field (Hb) is applied in a direction of ↓.

A low-temperature cycle will be described below with reference to FIG. 25.

Low-temperature Cycle

A low-level laser beam is radiated on a bit in Condition 1 to increase the medium temperature to $T_L$. Since $T_L$ is almost equal the Curie temperature $T_{C1}$ of the first layer, its magnetization disappears. In this condition, since $H_{C2}$ is sufficiently large, the magnetization ↑ of the second layer will not be reversed by ↓ Hb. This condition corresponds to Condition $2_L$.

When the bit falls outside the spot region of the laser beam in Condition $2_L$, the medium temperature begins to be decreased. When the medium temperature is decreased slightly below $T_{C1}$, the RE and TM spins (↓↑) of the second layer influence those of the first layer due to the exchange coupling force. The exchange coupling force acts to align the RE spins themselves (↓) and TM spins themselves (↑). As a result, magnetization ↓↑, i.e., ↓ appears in the first layer. This condition corresponds to Condition $3_L$.

Condition $3_L$ is maintained even when the medium temperature is decreased to the room temperature. As a result, a bit in the "non-A direction" ↓ is formed.

A high-temperature cycle will be described below with reference to FIG. 26.

High-temperature Cycle

When a high-level laser beam is radiated on a bit in Condition 1 before recording to increase the medium temperature to $T_L$, since $T_L$ is almost equal to the Curie temperature $T_{C1}$ of the first layer, its magnetization disappears (Condition $2_H$=Condition $2_L$). When the beam radiation continues and the medium temperature is further increased up to $T_H$, since the temperature $T_H$ of the second layer is almost equal to $T_{C2}$, its magnetization also disappears. This condition corresponds to Condition $3_H$.

When the bit falls outside the spot region of the laser beam in Condition $3_H$, the medium temperature begins to be decreased. When the medium temperature is decreased slightly below $T_{C2}$, magnetization appears in the second layer. In this case, magnetization ↓ (↑↓) appears due to ↓ Hb. However, since the temperature is higher than $T_{C1}$, no magnetization appears in the first layer This condition corresponds to Condition $4_H$.

When the medium temperature is further decreased slightly below $T_{C1}$, magnetization appears in the first layer. At this time, the exchange coupling force from the second layer acts to align RE spins themselves (↑) and TM spins themselves (↓). As a result, magnetization ↑↓, i.e., ↑ appears in the first layer to overcome ↓ Hb. This condition corresponds to Condition $5_H$.

The medium temperature is then decreased from the temperature in Condition $5_H$ to the room temperature. Since $H_{C1}$ at the room temperature is sufficiently large, he magnetization of the first layer is stably maintained. Thus, a bit in the "A direction" ↑ is formed.

The principle of the over-write method will be described in detail below using a medium No. 7 belonging to a recording medium of Class 7 (P type, Quadrant III, Type 4) shown in Table 1.

This medium No. 7 has a relation given by Formula 41:

$$T_R < T_L < T_H \lesssim T_{C1} \lesssim T_{C2} \qquad \text{Formula 41}$$

For the sake of simplicity, $T_H < T_{C1} < T_{C2}$ in the following description. FIG. 27 shows this relation as a graph.

A condition for reversing only the direction of magnetization of the second layer by the initial field Hini at the room temperature $T_R$ without reversing that of the first layer is represented by Formula 42. This medium No. 7 satisfies Formula 42:

$$H_{C1} > H_{C2} + \frac{\sigma_w}{2M_{S1}t_1} + \frac{\sigma_w}{2M_{S2}t_2} \qquad \text{Formula 42}$$

A condition for Hini. at this time is given by Formula 45. When Hini. disappears, the directions of magnetization of the first and second layers influence to each other due to the interface wall energy. Conditions for maintaining the directions of magnetization of the first and second layers without being reversed are represented by Formulas 43 and 44. This medium No. 7 satisfies Formulas 43 and 44:

$$H_{C1} > \frac{\sigma_w}{2M_{S1}t_1} \quad \text{Formula 43}$$

$$H_{C2} > \frac{\sigma_w}{2M_{S2}t_2} \quad \text{Formula 44}$$

The magnetization of the second layer of the recording medium which satisfies Formulas 42 to 44 at the room temperature is aligned in, e.g., the "A direction" ↑ (↓↑) by Hini. which satisfies the condition given by Formula 45 immediately before recording:

$$H_{C2} + \frac{\sigma_w}{2M_{S2}t_2} < |H_{ini}| < H_{C1} - \frac{\sigma_w}{2M_{S1}t_1} \quad \text{Formula 45}$$

At this time, the first layer is left in the recorded state (Condition 1a or 1b in FIGS. 28 and 29). Condition 1a or 1b is maintained immediately before recording.

The bias field Hb is assumed to be applied in the "non-A direction" ↓.

When the medium has a disk shape, a condition for inhibiting magnetization of a recorded bit (in particular, a bit in Condition 1b in which the direction of magnetization of the first layer is opposite to the direction of Hb) from being reversed by Hb when it approaches an Hb applying means is represented by Formula 45-2:

$$Hb < H_{C1} + \frac{\sigma_w}{2M_{S1}t_1} \quad \text{Formula 45-2}$$

The disk medium must satisfy this formula at the room temperature. A condition for inhibiting the initialized second layer from being reversed by Hb when it approaches the Hb applying means is represented by Formula 45-3:

$$Hb < H_{C2} + \frac{\sigma_w}{2M_{S2}t_2} \quad \text{Formula 45-3}$$

In other words, conditions for determining Hb are Formulas 45-2 and 45-3.

A bit in Condition 1a or 1b then reaches the spot region of the laser beam. The laser beam intensity includes two, i.e., high and low levels.

A low-temperature cycle will be described below with reference to FIG. 28.

Low-temperature Cycle

A low-level laser beam is radiated on a bit in Condition 1a or 1b, and the medium temperature is increased to $T_L$. Thus, the following condition is satisfied:

$$H_{C1} + Hb < \frac{\sigma_w}{2M_{S1}t_1}$$

Thus, Condition 1a transits to Condition $2_L$. Meanwhile, Condition 1b is maintained, and becomes Condition $2_L$.

When the bit falls outside the spot region of the laser beam in condition $2_L$, the medium temperature begins to be decreased.

Since $H_{C1}$ is sufficiently large at the room temperature (see Formula 45-2), Condition $2_L$ can be maintained at the room temperature.

As a result, a bit in the "A direction" ↑ is formed in the first layer.

A high-temperature cycle will be described below with reference to FIG. 29.

High-temperature Cycle

A high-level laser beam is radiated on a bit in Condition 1a or 1b before recording, and the medium temperature is increased to the low temperature $T_L$. As a result, Condition $2_H$ equal to Condition $2_L$ is established.

The beam radiation continues and the medium temperature then reaches $T_H$. Since $T_H$ approaches the Curie temperatures of the first and second layers, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are almost simultaneously reversed to follow the direction of ↓ Hb. This condition corresponds to Condition $3_H$.

When the bit falls outside the spot region of the laser beam in Condition $3_H$, the medium temperature begins to be decreased.

The medium temperature is then returned to the room temperature. However, Condition $4_H$ is left unchanged.

As a result, a bit in the "non-A direction" ↓ is formed in the first layer.

The principle of the over-write method will be described in detail below using a medium No. 8 belonging to a recording medium of Class 8 (A type, Quadrant IV, Type 2) shown in Table 1.

This medium No. 8 has a relation given by Formula 46:

$$T_R < T_L < T_H \lesssim T_{C1} \lesssim T_{C2} \quad \text{Formula 46}$$

For the sake of simplicity, $T_H < T_{C1} < T_{C2}$ in the following description. $T_{comp.2}$ may be lower than or equal to $T_L$ and $T_{C1}$. However, for the sake of simplicity, $T_L < T_{C1} < T_{comp.2}$ in the following description. FIG. 30 shows this relation as a graph.

A condition for reversing only the direction of magnetization of the second layer by the initial field Hini. at the room temperature $T_R$ without reversing that of the first layer is represented by Formula 47. This medium No. 8 satisfies Formula 47:

$$H_{C1} > H_{C2} + \left| \frac{\sigma_w}{2M_{S1}t_1} - \frac{\sigma_w}{2M_{S2}t_2} \right|$$ Formula 47

A condition for Hini. at this time is given by Formula 50. When Hini. disappears, the directions of magnetization of the first and second layers influence to each other due to the interface wall energy. Conditions for maintaining the directions of magnetization of the first and second layers without being reversed are represented by Formulas 48 and 49. This medium No. 8 satisfies Formulas 48 and 49:

$$H_{C1} > \frac{\sigma_w}{2M_{S1}t_1}$$ Formula 48

$$H_{C2} > \frac{\sigma_w}{2M_{S2}t_2}$$ Formula 49

The magnetization of the second layer of the recording medium which satisfies Formulas 47 to 49 at the room temperature is aligned in, e.g., the "A direction" ↑ (↑⇂) by Hini. which satisfies the condition given by Formula 50 immediately before recording:

$$H_{C2} + \frac{\sigma_w}{2M_{S2}t_2} < |Hini.| < H_{C1} + \frac{\sigma_w}{2M_{S1}t_1}$$ Formula 50

At this time, the first layer is left in the recorded state (Condition 1a or 1b in FIGS. 31 and 32). Condition 1a or 1b is maintained immediately before recording.

The bias field Hb is assumed to be applied in the "A direction" ↑.

When the medium has a disk shape, a condition for inhibiting magnetization of a recorded bit (in particular, a bit in Condition 1b in which the direction of magnetization of the first layer is opposite to the direction of Hb) from being reversed by Hb when it approaches an Hb apply means is represented by Formula 50-2:

$$Hb < H_{C1} + \frac{\sigma_w}{2M_{S1}t_1}$$ Formula 50-2

The disk medium must satisfy this formula at the room temperature. In other words, a condition for determining Hb is given by Formula 50-2.

A bit in Condition 1a or 1b then reaches the spot region of the laser beam. The laser beam intensity includes two, i.e., high and low levels.

A low-temperature cycle will be described below with reference to FIG. 31.

Low-temperature Cycle

A low-level laser beam is radiated on a bit in Condition 1a or 1b, and the medium temperature is increased to $T_L$. Thus, the following condition is satisfied:

$$H_{C1} + Hb < \frac{\sigma_w}{2M_{S1}t_1}$$

Thus, Condition 1a transits to Condition $2_L$. Meanwhile, Condition 1b is maintained, and becomes Condition $2_L$.

When the bit falls outside the spot region of the laser beam in Condition $2_L$, the medium temperature begins to be decreased. Even when the medium temperature is decreased to the room temperature, Condition $2_L$ is maintained since $H_{C1}$ is sufficiently large (see Formula 50-2).

As a result, a bit in the "non-A direction" is formed in the first layer.

A high-temperature cycle will be described below with reference to FIG. 32.

High-temperature Cycle

A high-level laser beam is radiated on a bit in Condition 1a or 1b before recording, and the medium temperature is increased to the low temperature $T_L$. As a result, Condition $2_H$ equal to Condition $2_L$ is established.

Upon radiation of the high-level laser beam, the medium temperature is further increased. When the medium temperature exceeds $T_{comp.2}$, the medium type is shifted from A type to P type. The relationship between the strengths of RE spin (↑) and TM spin (⇂) of the second layer is reversed (↑⇂→↑⇂) while their directions are left unchanged. As a result, the direction of magnetization of the second layer is reversed to the "non-A direction" ↓. This condition corresponds to Condition $3_H$.

However, since $H_{C2}$ is still large at this temperature, the magnetization ↓ of the second layer will not be reversed by ↑ Hb.

The beam radiation further continues, and the medium temperature is further increased up to $T_H$. Since the medium temperature is near the Curie temperatures of the first and second layers, the coercivities of the two layers are decreased. As a result, the medium satisfies one of following Formulas (1) to (3):

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are almost simultaneously reversed to follow the direction of ↑ Hb. This condition corresponds to Condition $4_H$.

When the bit falls outside the spot region of the laser beam in Condition $4_H$, the medium temperature begins to be decreased. When the medium temperature is decreased below $T_{comp.2}$, the medium type is restored from P type to original A type. The relationship between the strengths of RE spin (↓) and TM spin (↑) is reversed (↓↑→↓↑) while their directions are left unchanged. As a result, the direction of magnetization of the second layer is reversed to the "non-A direction" ↓. In this condition, since $H_{C2}$ has already been considerably large, the magnetization ↓ of the second layer will not be reversed by ↑ Hb. This condition corresponds to Condition $5_H$.

The medium temperature is then decreased from the temperature in Condition $5_H$ to the room temperature. However, Condition $5_H$ is left unchanged.

In this manner, a bit in the "A direction" ↑ is formed in the first layer.

The principle of the over-write method will be described in detail below using a medium No. 9 belonging to a recording medium of Class 9 (A type, Quadrant IV, Type 4) shown in Table 1.

This medium No. 9 has a relation given by Formula 51:

$$T_R < T_{C1} \approx T_L < T_{C2} \approx T_H \quad \text{Formula 51}$$

FIG. 33 shows this relation as a graph.

A condition for reversing only the direction of magnetization of the second layer by the initial field Hini. at the room temperature $T_R$ without reversing that of the first layer is represented by Formula 52. This medium No. 9 satisfies Formula 52:

$$H_{C1} > H_{C2} + \left| \frac{\sigma_w}{2M_{S1}t_1} - \frac{\sigma_w}{2M_{S2}t_2} \right| \quad \text{Formula 52}$$

where
$H_{C1}$: coercivity of first layer
$H_{C2}$: coercivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy A condition for Hini. at this time is given by Formula 55. When Hini. disappears, the reversed magnetization of the second layer is influenced by that of the first layer due to the exchange coupling force. Conditions for holding the magnetization of the second layer without being re-reversed are given by Formulas 53 and 54. This medium No. 9 satisfies Formulas 53 and 54:

$$H_{C1} > \frac{\sigma_w}{2M_{S1}t_1} \quad \text{Formula 53}$$

$$H_{C2} > \frac{\sigma_w}{2M_{S2}t_2} \quad \text{Formula 54}$$

$$H_{C2} + \frac{\sigma_w}{2M_{S2}t_2} < |H_{ini.}| < H_{C1} + \frac{\sigma_w}{2M_{S1}t_1} \quad \text{Formula 55}$$

The magnetization of the second layer of the recording medium which satisfies the conditions given by Formulas 52 to 54 at the room temperature is aligned in, e.g. the "A direction" ↑ (↑↓) by Hini. which satisfies the condition given Formula 55 immediately before recording. At this time, the first layer is kept in the recorded state (Condition 1 in FIGS. 34 and 35). Condition 1 is maintained immediately before recording. In this case, the bias field (Hb) is applied in a direction of ↓.

A low-temperature cycle will be described below with reference to FIG. 34.

Low-temperature Cycle

A low-level laser beam is radiated on a bit in Condition 1 to increase the medium temperature to $T_L$. Since $T_L$ is almost equal to the Curie temperature $T_{C1}$ of the first layer, its magnetization disappears. In this condition, since $H_{C2}$ is sufficiently large, the magnetization ↑ of the second layer will not be reversed by ↓ Hb. This condition corresponds to Condition $2_L$.

When the bit falls outside the spot region of the laser beam in Condition $2_L$, the medium temperature begins to be decreased. When the medium temperature is decreased slightly below $T_{C1}$, RE and TM spins (↑↓) of the second layer influence those of the first due to the exchange coupling force. The exchange coupling force acts to align the RE spins themselves (↑) and TM spins themselves (↓). As a result, magnetization ↑↓, i.e., ↓ appears in the first layer. This condition corresponds to Condition $3_L$.

Condition $3_L$ is maintained even when the medium temperature is decreased to the room temperature. As a result, a bit in the "non-A direction" ↓ is formed.

A high-temperature cycle will be described below with reference to FIG. 35.

High-temperature Cycle

When a high-level laser beam is radiated on a bit in Condition 1 before recording to increase the medium temperature to $T_L$, since $T_L$ is almost equal to the Curie temperature $T_{C1}$ of the first layer, its magnetization disappears (Condition $2_H$=Condition $2_L$).

When the beam radiation continues and the medium temperature is further increased up to $T_H$, since the temperature $T_H$ of the second layer is almost equal to $T_{C2}$, its magnetization also disappears. This condition corresponds to Condition $3_H$.

When the bit falls outside the spot region of the laser beam in Condition $3_H$, the medium temperature begins to be decreased. When the medium temperature is decreased slightly below $T_{C2}$, magnetization appears in the second layer. In this case, magnetization ↓ (↓↑) appears due to ↓ Hb. However, since the temperature is higher than $T_{C1}$, no magnetization appears in the first layer. This condition corresponds to Condition $4_H$.

When the medium temperature is further decreased slightly below $T_{C1}$, magnetization appears in the first layer. At this time, the exchange coupling force from the second layer (↓↑) acts to align RE spins themselves (↓) and TM spins themselves (↑). As a result, magnetization ↓↑, i.e., ↑ appears in the first layer to overcome ↓ Hb. condition corresponds to Condition $5_H$.

The medium temperature is then decreased from the temperature in Condition $5_H$ to the room temperature. Since $H_{C1}$ at the room temperature is sufficiently large, the magnetization of the first layer is stably maintained. Thus, a bit in the "A direction" ↑ is formed.

SUMMARY OF THE INVENTION

As one of conventional over-write capable magnetooptical recording methods, a so-called bit position recording method is known.

In this method, bits ($B_1$) are intermittently formed along the longitudinal direction of a track, and the size of each bit ($B_1$) is theoretically constant. Data is expressed based on the presence/absence of the bits ($B_1$), there being a distance between adjacent bits ($B_1$). Of course, the direction of magnetization of each bit ($B_1$) is opposite to the direction of magnetization of a track portion other than the bit ($B_1$) (this portion corresponds to a bit ($B_0$)).

Also, when a medium is rotated, (1) a method of making constant linear velocity of the medium at a beam radiation position (spot position) regardless of position on the medium, and (2) a method of making constant annular velocity of the medium at a beam radiation position (spot position) regardless of position on the medium are known. The former method (1) has a drawback of complicated velocity control of a spindle motor for rotating the medium. In contrast to this, since the latter method (2) need only make rotational speed per unit time constant, velocity control of the spindle motor is simple. For this reason, the latter method is normally used.

Thus, the present inventor tried to perform bit position recording with constant angular velocity and constant high- and low-level intensities of a laser beam regardless of radiation of a medium in over-write recording described in the basic principle.

As data, a basic pattern in which bits ($B_1$) and bits ($B_0$) are alternately aligned (which cannot express data in practice) was used for a test. The reason for this is as follows. That is, when a ratio of a bit length $l_1$ of the bit ($B_1$) to a bit length $l_0$ is set to be 1:1, a highest C/N ratio can be theoretically obtained during reproduction, and it is preferable for a comparison test.

In order to form such a bit array, theoretically, the laser beam can be pulse-modulated with a constant frequency between high and low levels, as shown in FIG. 37. Of course, a duty ratio ($t_1/t_0$) of high level/low level is 1:1. Under such an assumption, a high-level emission time $t_1$ ($=t_0$) and a low-level emission time $t_0$ are determined.

In a practical test, however, it was found that C/N ratio was low at an inner portion of the medium. The present inventor found that since linear velocity at an inner portion was lower than that at an outer portion, an amount of high-level laser beam per unit area and unit time was large, a bit had a larger length than desired (this is called a trailing phenomenon), and as a result, the bit ($B_1$) and the bit ($B_0$) were connected to each other.

Thus, as indicated by a broken line in FIG. 36, the present inventor retried a test with a slightly lower high-level intensity. It was found that no bit ($B_1$) could be formed on the outer portion, in addition to a low C/N ratio. The present inventor found that although the trailing phenomenon could be eliminated, a width of the bit ($B_1$) in the widthwise direction of a track, i.e., a thickness was decreased, and reflected light including a large amount of signal could not be returned from the bit during reproduction, resulting in a low C/N ratio.

Then, high-level emission time was shortened without decreasing the high-level intensity to slightly decrease duty ratio. It was found that a slight trailing phenomenon appeared, a ratio of $l_1/l_0$ almost became 1:1, and a thick bit could be formed, thereby increasing C/N ratio.

In some cases, since linear velocity was high at the outer portion, high-level intensity of a laser beam became short, and the width of the formed bit ($B_1$) was decreased. However, it was found that since the length $l_1$ of the bit ($B_1$) and the length $l_0$ of the bit ($B_0$) were originally larger than those at the inner portion, a high C/N ratio could be obtained, and there was no problem in terms of C/N ratio although the width of the bit ($B_1$) was decreased.

The present inventor proposed that level intensity be made constant at both the inner and outer portions, and instead, that emission time be relatively shortened at the inner portion and relatively prolonged at the outer portion.

However, when the prevent inventor conducted a test according to this method, previous data appeared at the outer portion, and C/N ratio was decreased, thus posing another problem.

The present inventor made extensive studies, and found the following cause of the problem. That is, since the linear velocity was increased toward the outer portion while the angular velocity was constant, the amount of low-level laser beam per unit area and unit time became short, and hence, the medium temperature could not be increased to the low temperature $T_L$. As a result, the bit ($B_0$) could not be formed, and the previous data (bit) was left.

The present inventor made further extensive studies, by which the present invention was achieved. That is, as indicated by a solid line in FIG. 36, the low-level intensity was relatively decreased at the inner portion, and was relatively increased at the outer portion, so that the medium temperature was increased to $T_L$ (below $T_H$ since the bit $B_1$ was formed) regardless of position on the medium, thus reliably forming the bit ($B_0$).

According to a first aspect of the present invention, there is provided an over-write capable magnetooptical bit position recording method of recording data by radiating a laser beam under the presence of a bias field on a magnetooptical recording medium formed by stacking at least two magnetic layers each having a perpendicular magnetic anisotropy and capable of performing an over-write operation by a light modulation method while pulse-modulating the laser beam intensity between high and low levels according to data to be recorded so as to record data, comprising the steps of:

making high-level intensity of the laser beam constant at both inner and outer portions of the medium, and shortening high-level emission time at the inner portion of the medium and prolonging high-level emission time at the outer portion of the medium; and decreasing low-level intensity of the laser beam at the inner portion of the medium, and increasing low-level intensity at the outer portion of the medium.

According to a second aspect of the present invention, there is provided a magnetooptical bit position recording apparatus comprising:

(1) rotating means for rotating a disk-like magnetooptical recording medium at a constant angular velocity;
(2) a laser beam source;
(3) modulating means for pulse-modulating a laser beam intensity between high and low levels according to data to be recorded by bit position recording;
(4) initial field applying means; and
(5) bias field applying means which can also serve as the initial field applying means, characterized by further comprising:

(6) first controlling means for making high-level beam intensity constant at both inner and outer portions of the medium, and increasing high-level emission time at the inner portion of the medium and decreasing high-level emission time at the outer portion; and
(7) second controlling means for decreasing low-level beam intensity at the inner portion of the medium, and increasing low-level beam intensity at the outer portion.

According to the present invention, at high-level for forming a bit ($B_1$), a beam intensity which is sufficient at the inner portion but is slightly short at the outer portion per unit area and unit time is made constant regardless of spot position, and instead, high-level emission time is shortened at the inner portion, thereby forming the bit ($B_1$) which has a large width and can be free from a trailing phenomenon. Thus, C/N ratio at the inner portion can be increased. Although a bit ($B_1$) having a slightly small width is formed at the outer portion since beam intensity is relatively short per unit area and unit time, since the linear velocity is high at the outer portion since the medium is rotated at constant angular velocity, a long bit ($B_1$) can be formed, and as a result, C/N ratio can be increased.

On the other hand, at low level for forming a bit ($B_0$), since the medium is rotated at constant angular velocity, the linear velocity at the outer portion is greater than the linear velocity at the inner portion. Therefore, although beam intensity per unit area and unit time is sufficient at the inner portion, it is short at the outer portion. When a low-level laser beam is radiated, the medium temperature at the spot position cannot be increased to the predetermined low temperature $T_L$, and a bit ($B_0$) cannot be formed. As a result, the previous data remains (i.e., cannot be erased), and C/N ratio is decreased. However, according to the present invention, since the low-level intensity is decreased a the inner portion and is increased at the outer portion, the medium temperature can be sufficiently increased to $T_L$ at the outer portion, and as a result, a desired bit ($B_0$) can be formed.

Note that it might be considered that the low-level intensity at the inner portion should be set to be equal to the sufficient intensity at the outer portion, i.e., set to be constant regardless of the spot position. However, if this is done, beam intensity per unit area and unit time is too strong at the inner portion, and the medium temperature is increased to the high temperature $T_H$ beyond $T_L$. As a result, a bit ($B_1$) is undesirably formed.

According to the present invention, at high-level, beam intensity per unit area and unit time is too strong at the inner portion (but does not pose a problem except for a trailing phenomenon). However, emission time is shortened to prevent an unnecessary trailing phenomenon. Meanwhile, a proper trailing phenomenon is positively utilized to form a bit ($B_1$) having a desired length.

In this manner, in an over-write capable magnetooptical bit position recording method in which a medium is rotated at a constant angular velocity according to the present invention, previous data will never be left, and C/N ratio of the entire medium can be increased regardless of inner and outer positions on the medium.

BRIEF DESCRIPTION OF THE DRAWINGS

FIG. 1 is a graph showing beam intensity in an over-write operation;

FIG. 2A is a schematic diagram of a multilayered structure of a recording medium;

FIG. 2B is a schematic diagram of states of magnetization of first and second layers of the recording medium;

FIGS. 6A and 6B are diagrams showing FIGS. 4 and 5 in units of P and A type media, respectively;

DETAILED DESCRIPTION OF THE PREFERRED EMBODIMENT

The present invention will be described in detail below by way of its examples and a reference example. However, the present invention is not limited to this.

Reference Example ... Manufacture of Type 8 Medium

A three-element RF magnetron sputtering apparatus is used, and a disk-like substrate having a thickness of 1.2 mm and a diameter of 130 mm is set in a vacuum chamber.

After the interior of the vacuum chamber is temporarily evacuated to $2 \times 10^{-7}$ Torr, argon (Ar) gas is introduced into the vacuum chamber, and sputtering is performed at a film formation rate of about 5 Å/sec while maintaining the Ar gas pressure to be $3 \times 10^{-3}$ Torr.

A TbFeCo alloy is used as a target, so that a first layer (recording layer) comprising a $Tb_{23}(Fe_{95}Co_5)_{77}$ perpendicular magnetic anisotropy film having a film thickness $t_1$ of 500 Å is formed on the substrate. Note that proportions in an alloy composition are expressed in atom. %. The same applies to the following description.

Sputtering is performed using a TbDyFeCo alloy as a target while maintaining a vacuum state, thereby forming a second layer (reference layer) comprising a $(Tb_{40}Dy_{60})_{27}(Fe_{70}Co_{30})_{73}$ perpendicular magnetic anisotropy film having a film thickness $t_2 = 1,500$ Å on the first layer.

Table 2 below summarizes magnetic characteristics (25° C.) of the two-layered magnetooptical recording medium belonging to Class 8 (A type, Quadrant IV, Type 2) manufactured in this manner.

TABLE 2

|  | First Layer | Second Layer |
|---|---|---|
| Composition | $Tb_{23}(Fe_{95}Co_5)_{77}$ | $(Tb_{40}Dy_{60})_{27}(Fe_{70}Co_{30})_{73}$ |
| Film Thickness t (Å) | 500 | 1,500 |
| Ms (emu/cc) | 35 | 120 |
| Hc (Oe) | 12,000 | 2,000 |
| Tc (°C.) | 180 | 280 |
| $T_{comp}$ (°C.) | None | 120 |
| $\sigma_w$ (erg/cm$^2$) | 3.7 | |

Example 1

Figure 3:
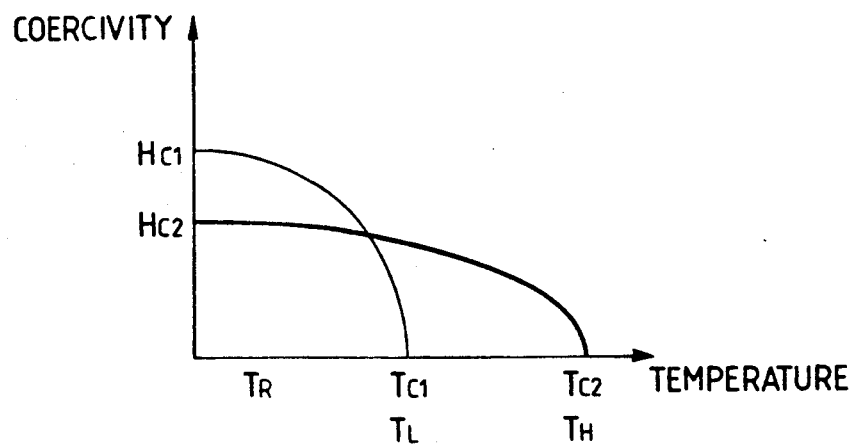
FIG. 3 is a graph showing the relationship between coercivity and temperature.
Figure 4:
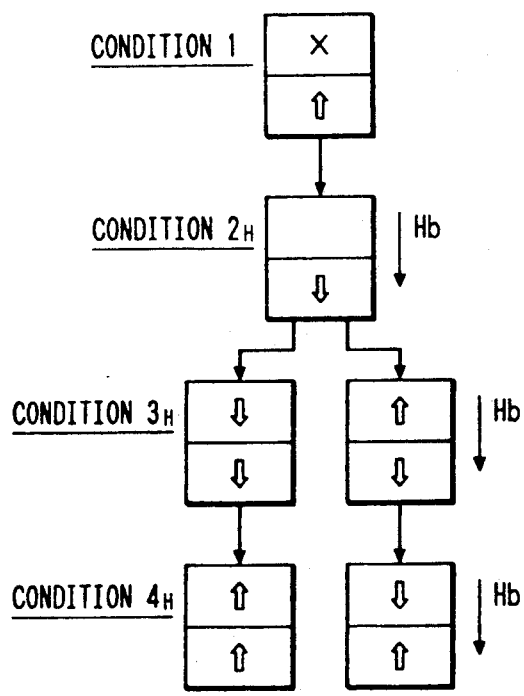
FIG. 4 is a diagram showing change in direction of magnetization upon radiation of a high-level laser beam.
Figure 5:
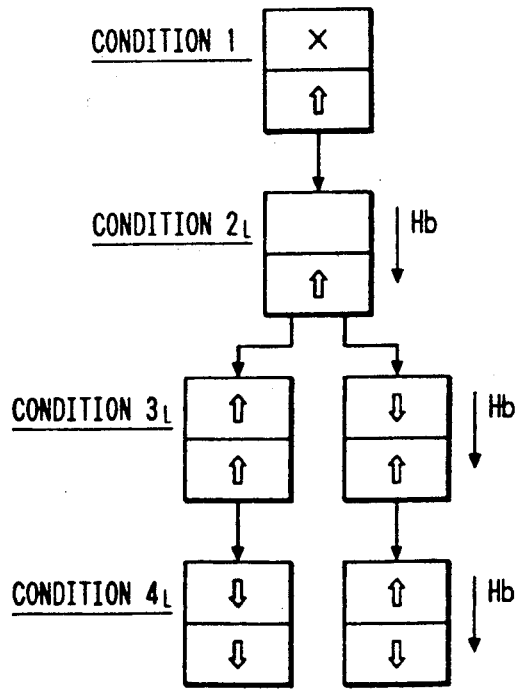
FIG. 5 is a diagram showing change in direction of magnetization upon radiation of a low-level laser beam.
Figure 7:
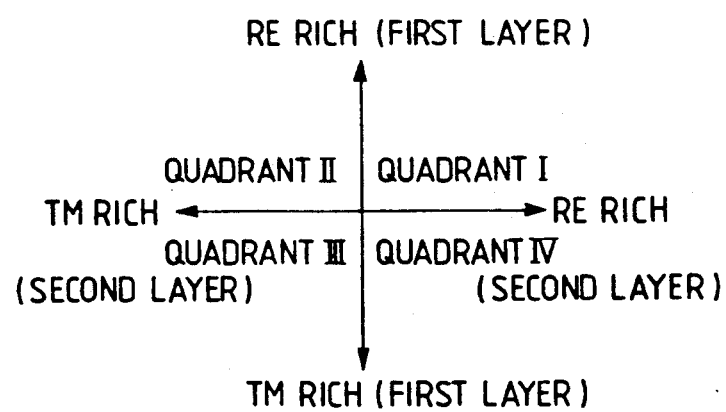
FIG. 7 is a diagram showing types of media in four quadrants.
Figure 8A:
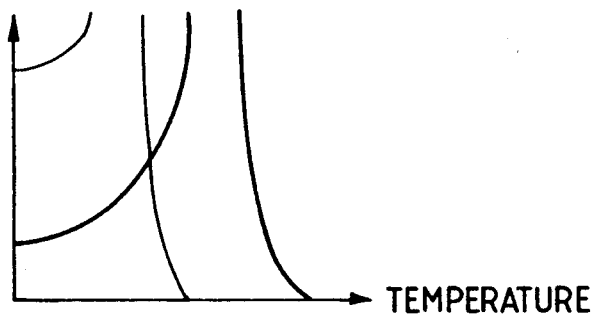
FIGS. 8A to 8D are graphs showing the relationship between coercivity and temperature for media of Type 1 to Type 4, respectively.
Figure 8B:
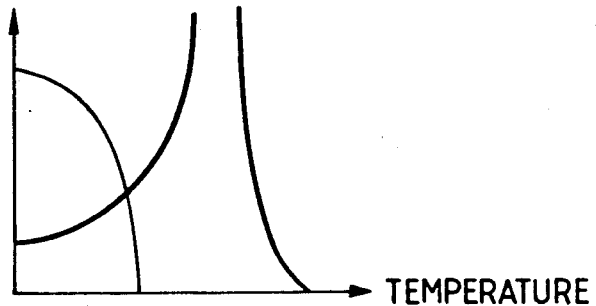
Figure 8C:
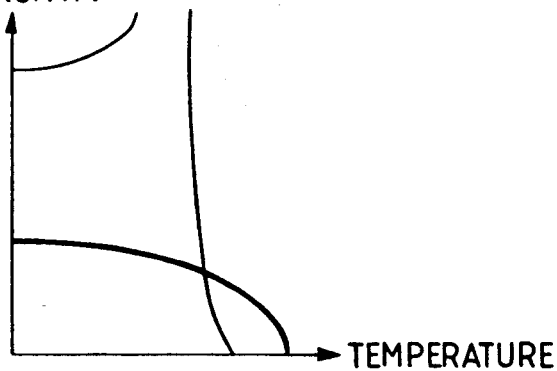
Figure 8D:
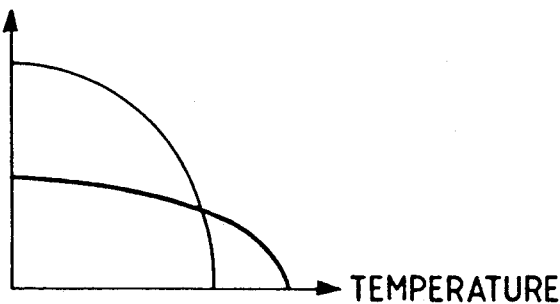
Figure 9:
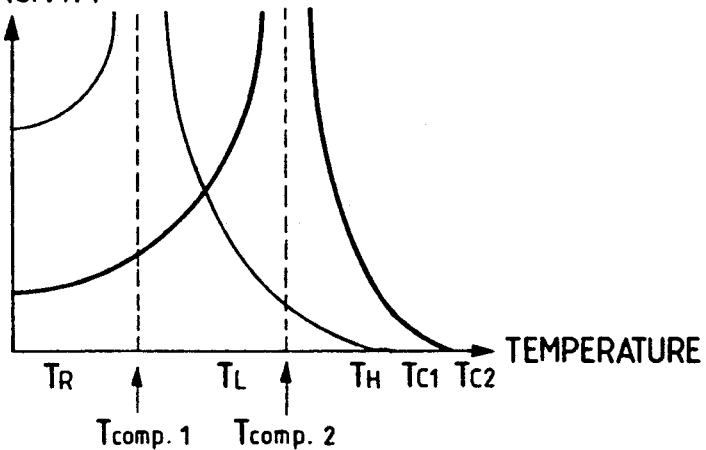
FIG. 9 is a graph showing the relationship between coercivity and temperature for a medium No. 1.
Figure 10:
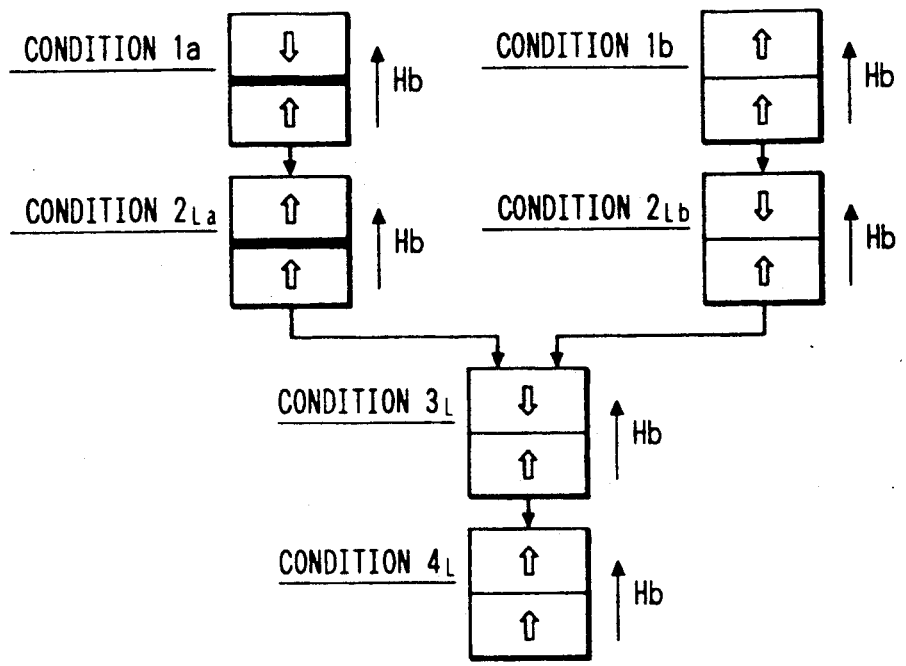
FIGS. 10 and 11 are diagrams showing change in direction of magnetization in high- and low-temperature cycles of the medium No. 1, respectively.
Figure 11:
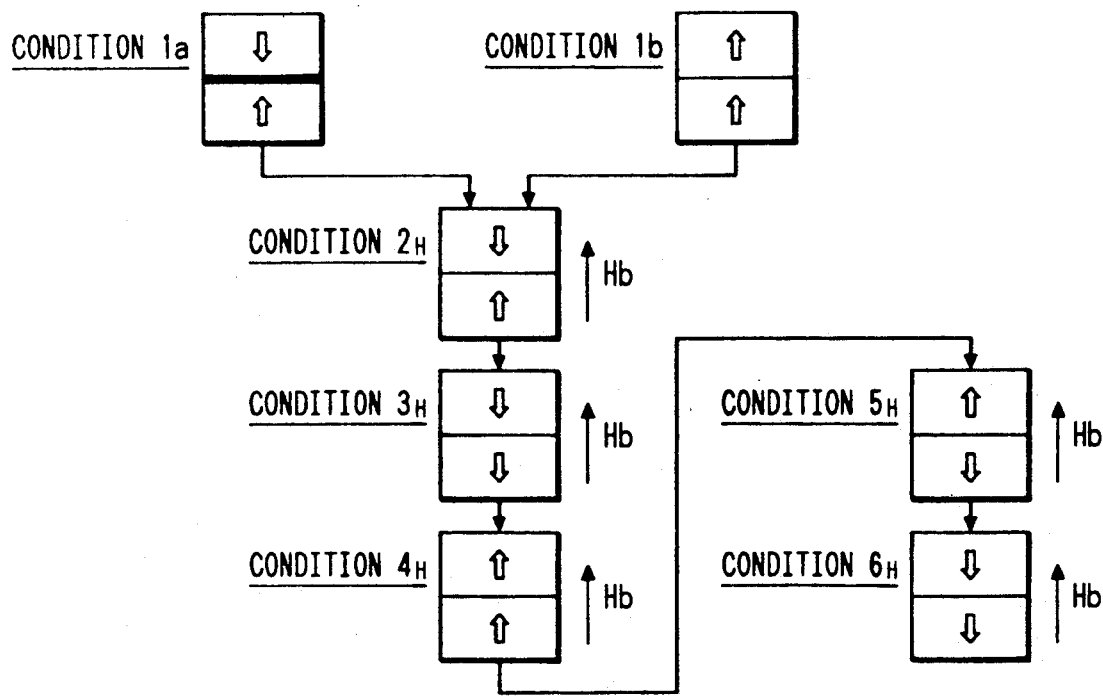
Figure 12:
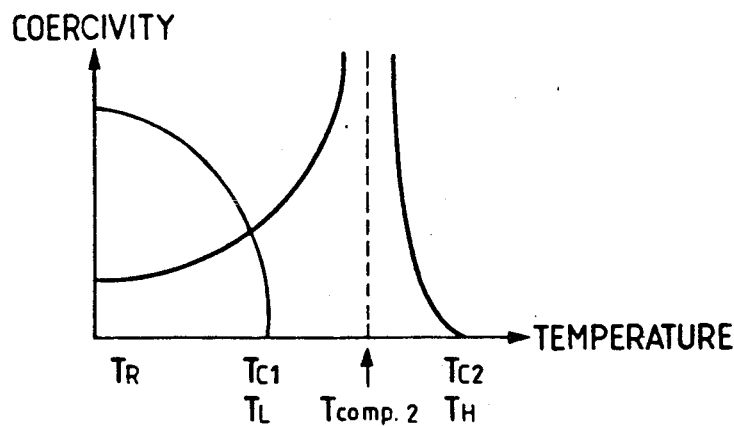
FIG. 12 is a graph showing the relationship between coercivity and temperature for a medium No. 2.
Figure 13:
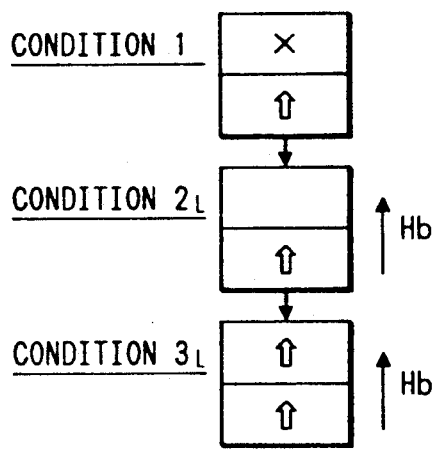
FIGS. 13 and 14 are diagrams showing change in direction of magnetization in low- and high-temperature cycles of the medium No. 2, respectively.
Figure 14:
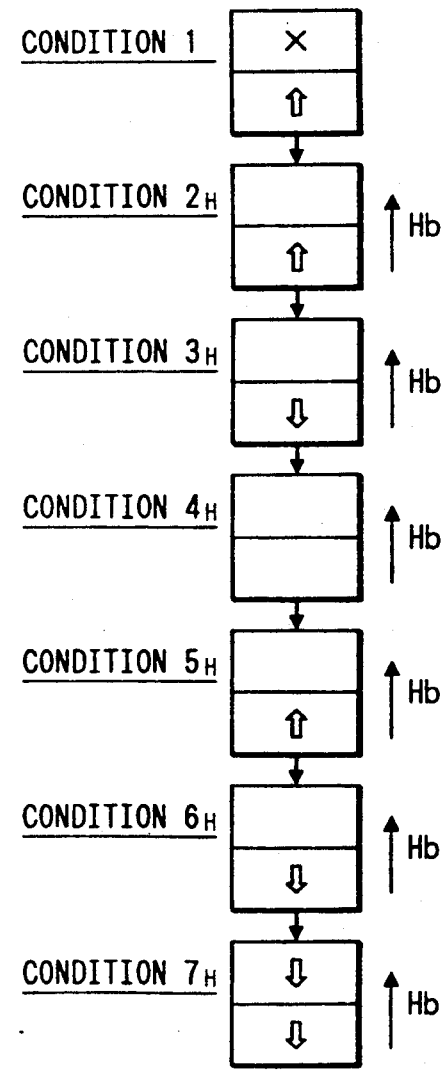
Figure 15:
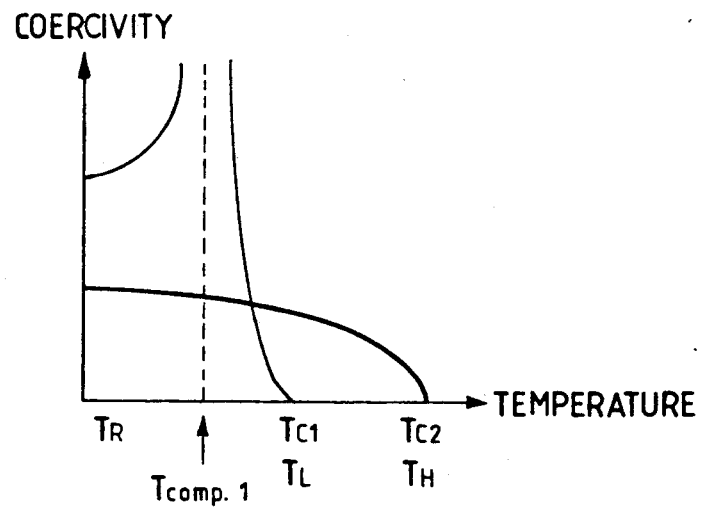
FIG. 15 is a graph showing the relationship between coercivity and temperature for a medium No. 3.
Figure 16:
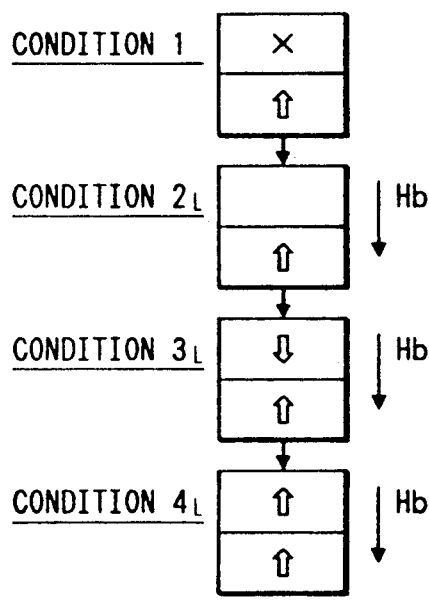
FIGS. 16 and 17 are diagrams showing change in direction of magnetization in low- and high-temperature cycles of the medium No. 3, respectively.
Figure 17:
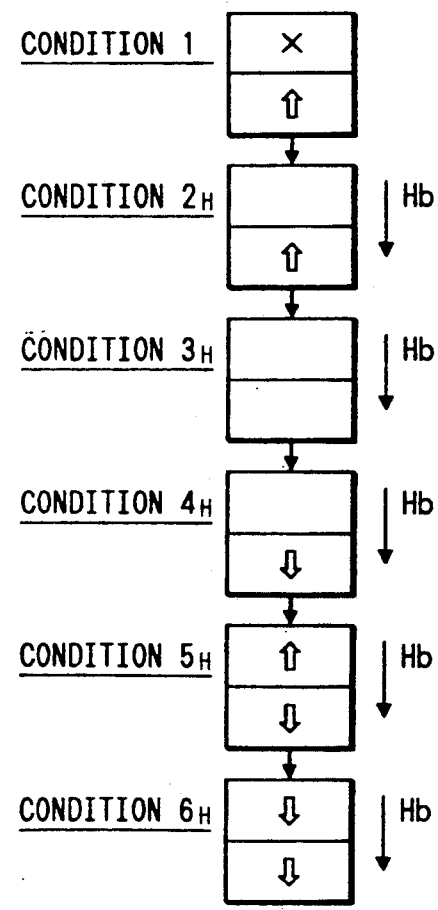
Figure 18:
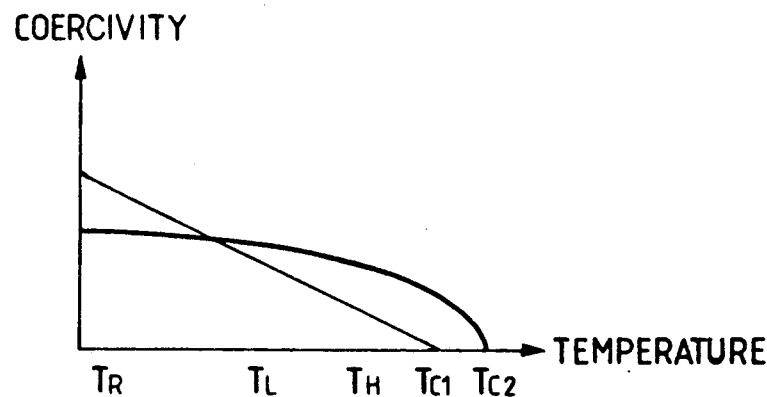
FIG. 18 is a graph showing the relationship between coercivity and temperature for a medium No. 4.
Figure 19:
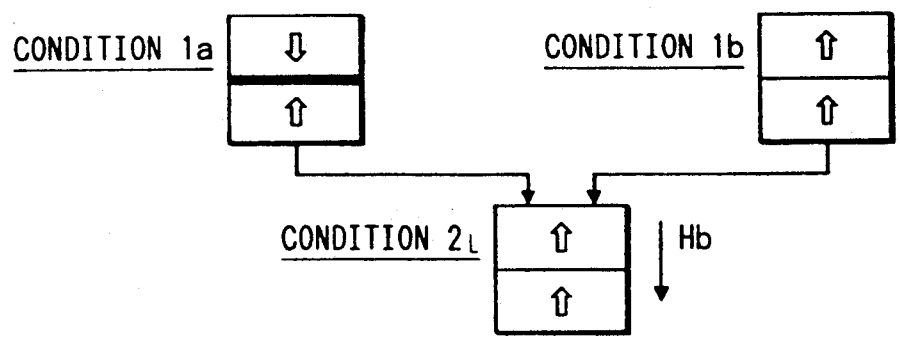
FIGS. 19 and 20 are diagrams showing change in direction of magnetization in low- and high-temperature cycles of the medium No. 4, respectively.
Figure 20:
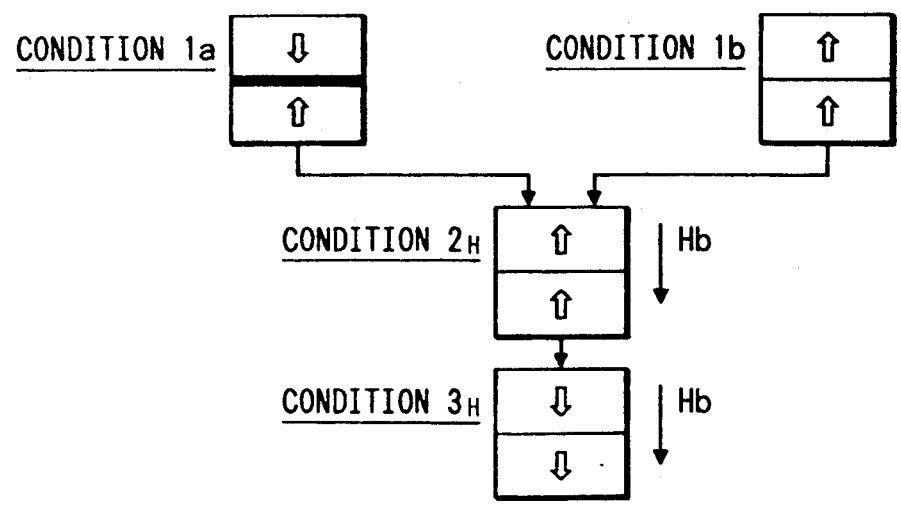
Figure 21:
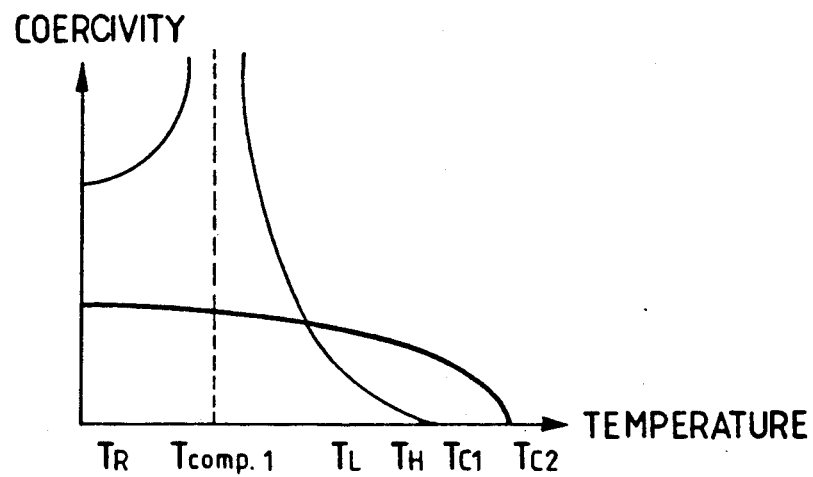
FIG. 21 is a graph showing the relationship between coercivity and temperature for a medium No. 5.
Figure 22:
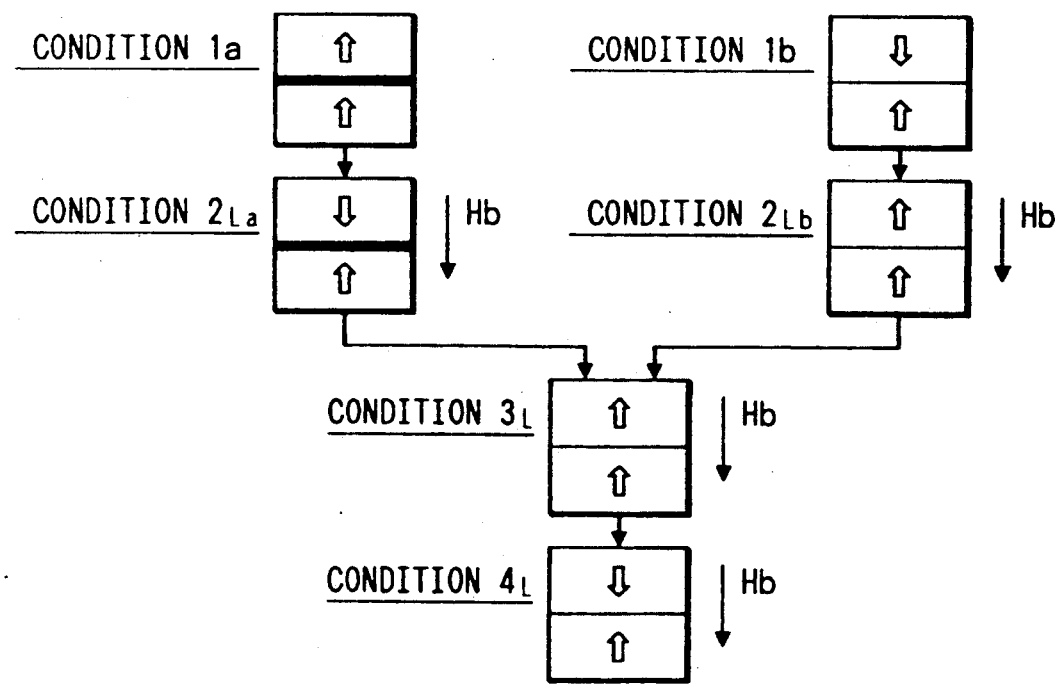
FIGS. 22 and 23 are diagrams showing change in direction of magnetization in low- and high-temperature cycles of the medium No. 5, respectively.
Figure 23:
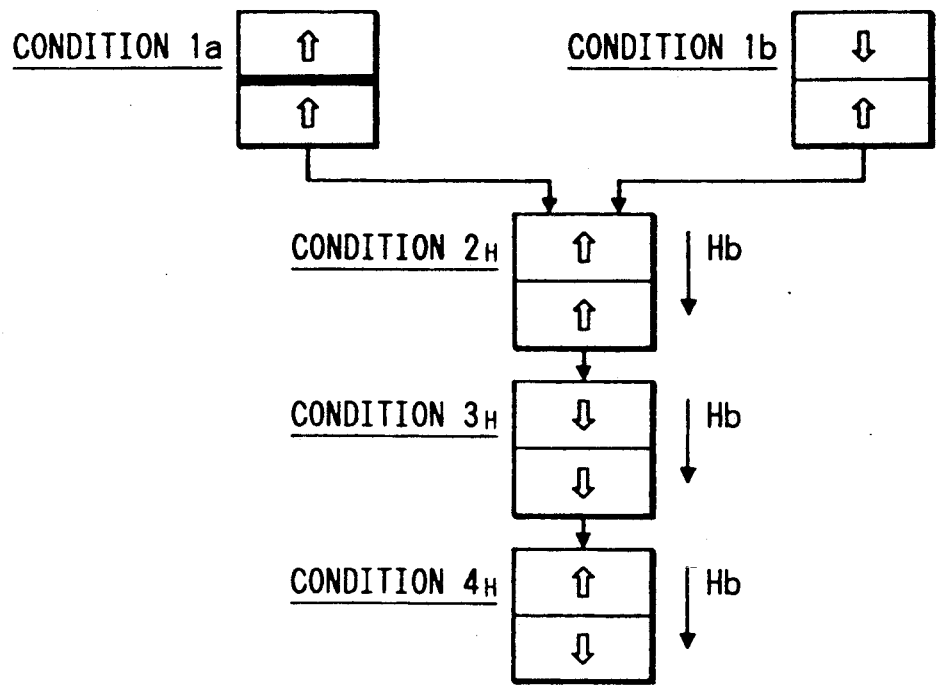
Figure 24:
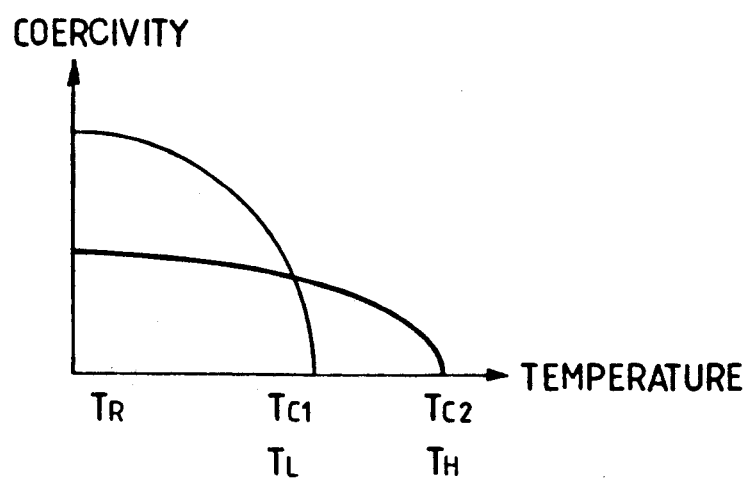
FIG. 24 is a graph showing the relationship between coercivity and temperature for a medium No. 6.
Figure 25:
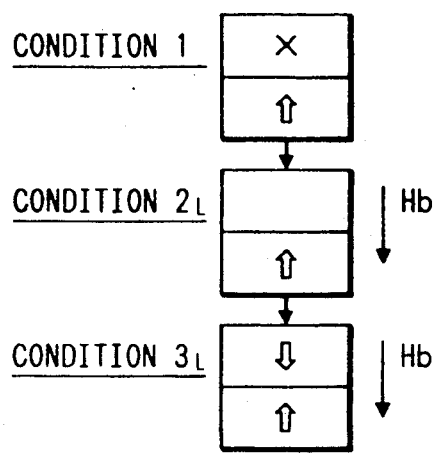
FIGS. 25 and 26 are diagrams showing change in direction of magnetization in low- and high-temperature cycles of the medium No. 6, respectively.
Figure 26:
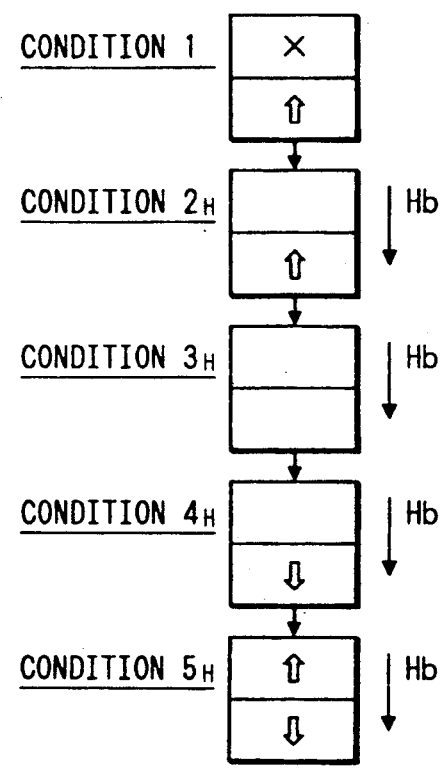
Figure 27:
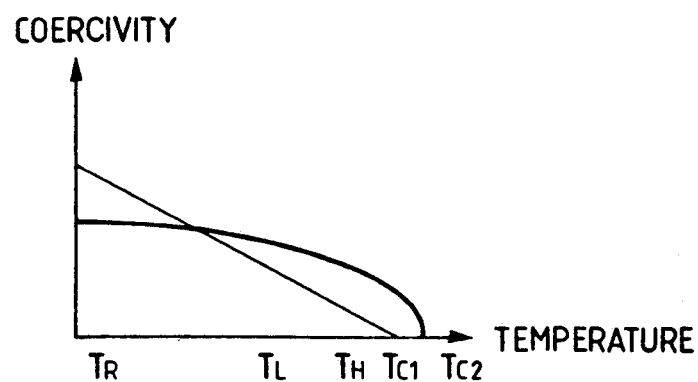
FIG. 27 is a graph showing the relationship between coercivity and temperature for a medium No. 7.
Figure 28:
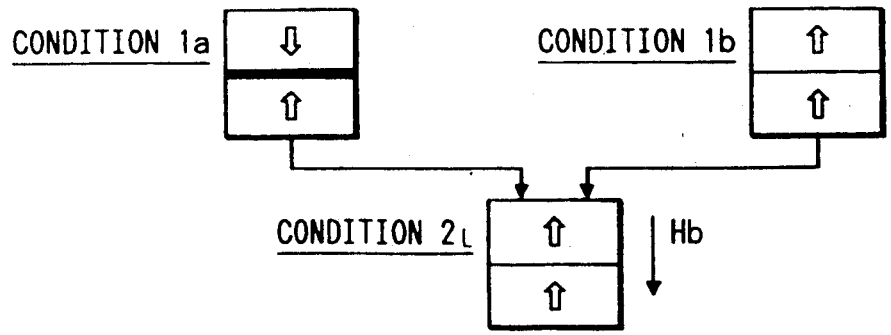
FIGS. 28 and 29 are diagrams showing change in direction of magnetization in low- and high-temperature cycles of the medium No. 7, respectively.
Figure 29:
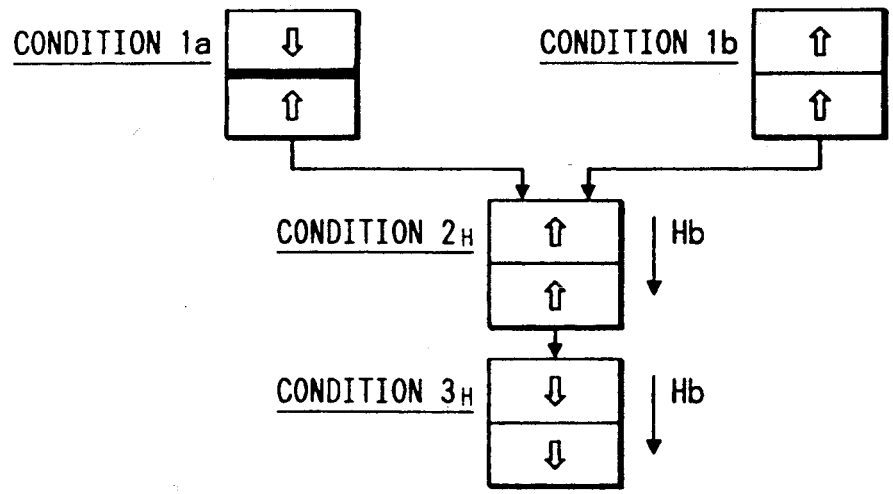
Figure 30:
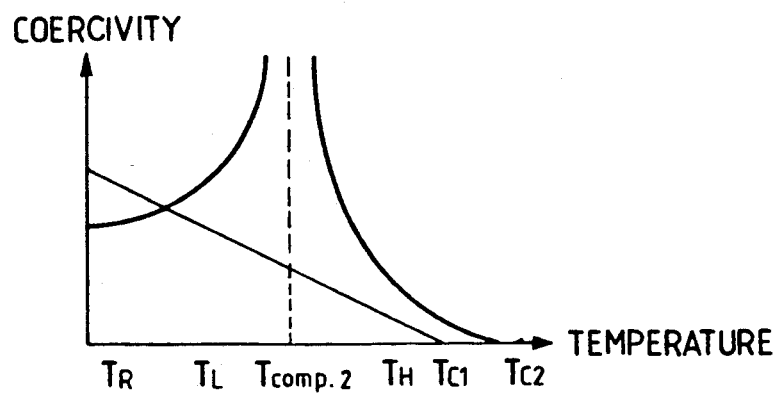
FIG. 30 is a graph showing the relationship between coercivity and temperature for a medium No. 8.
Figure 31:
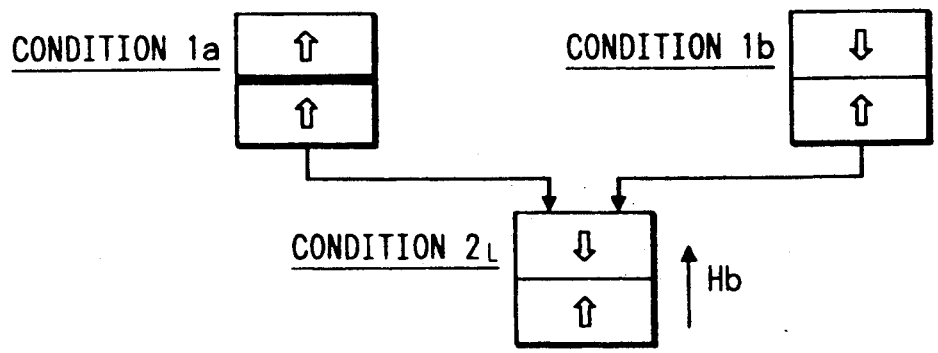
FIGS. 31 and 32 are diagrams showing change in direction of magnetization in low- and high-temperature cycles of the medium No. 8, respectively.
Figure 32:
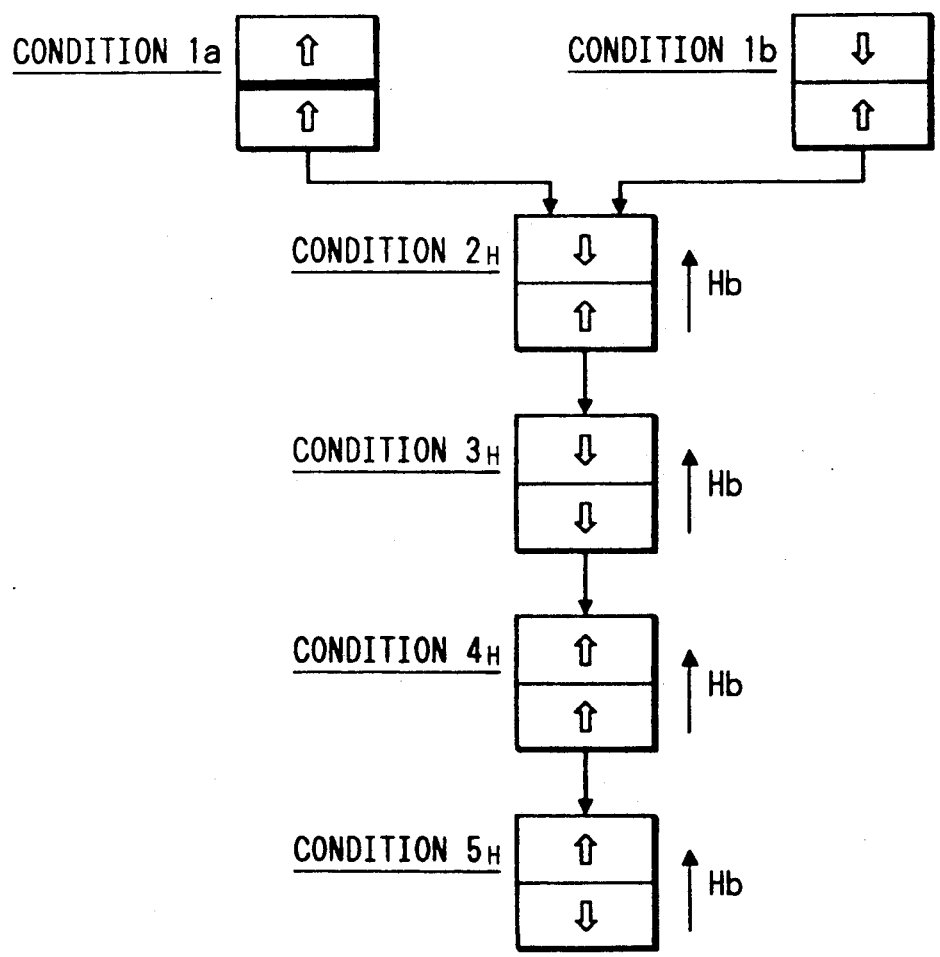
Figure 33:
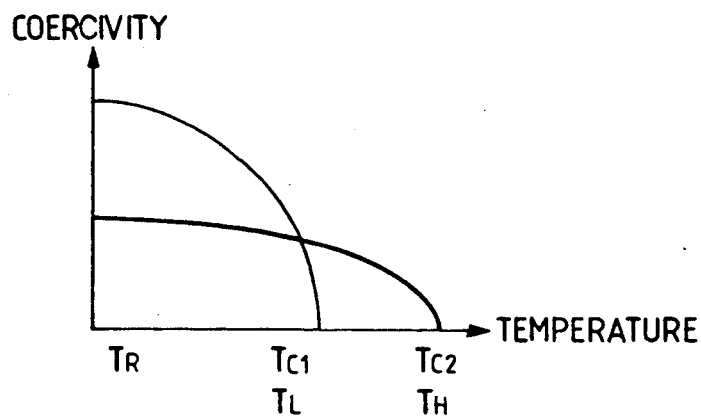
FIG. 33 is a graph showing the relationship between coercivity and temperature for a medium No. 9.
Figure 34:
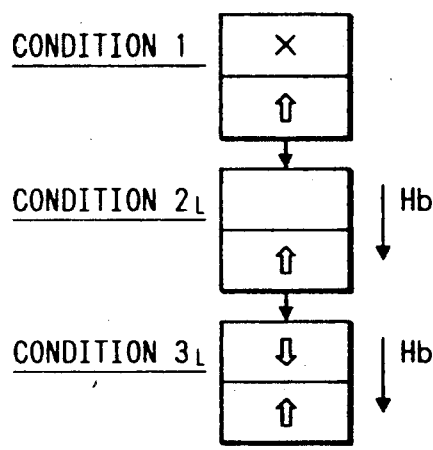
FIGS. 34 and 35 are diagrams showing change in direction of magnetization in low- and high-temperature cycles of the medium No. 9, respectively.
Figure 35:
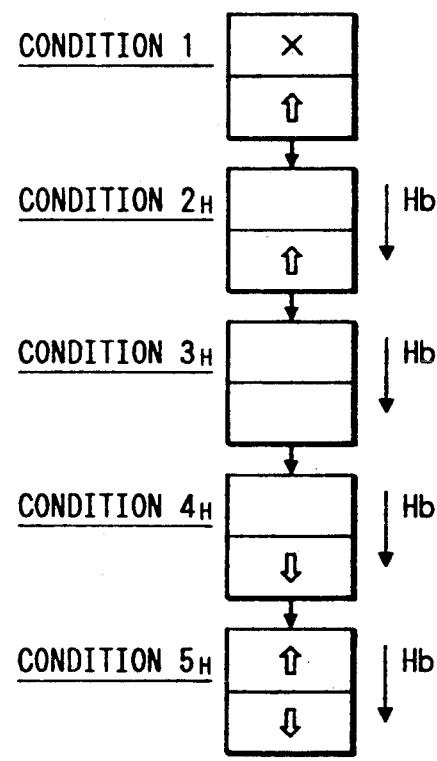
Figure 36:
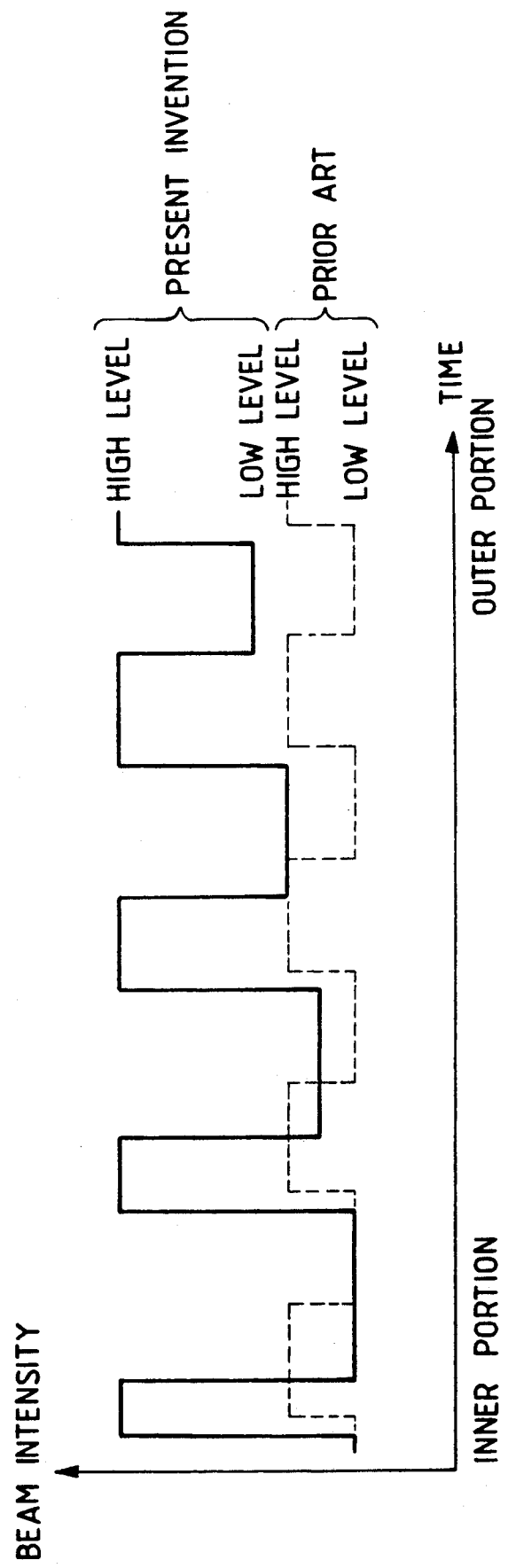
FIG. 36 is a waveform chart showing a laser beam intensity modulation method according to an embodiment of the present invention, in which a solid line represents a method of this embodiment, and a broken line represents a conventional method.
Figure 37:
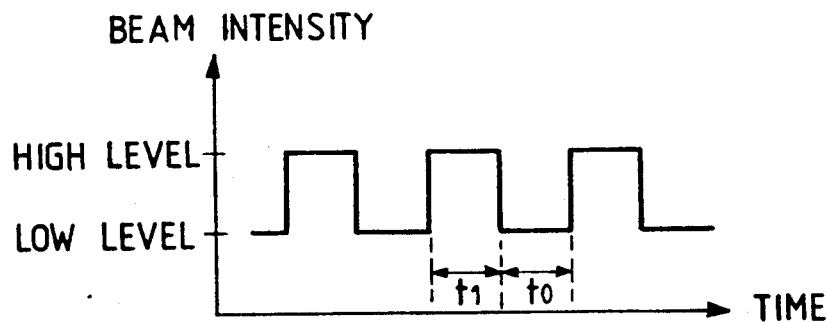
FIG. 37 is a waveform chart.
Figure 38:
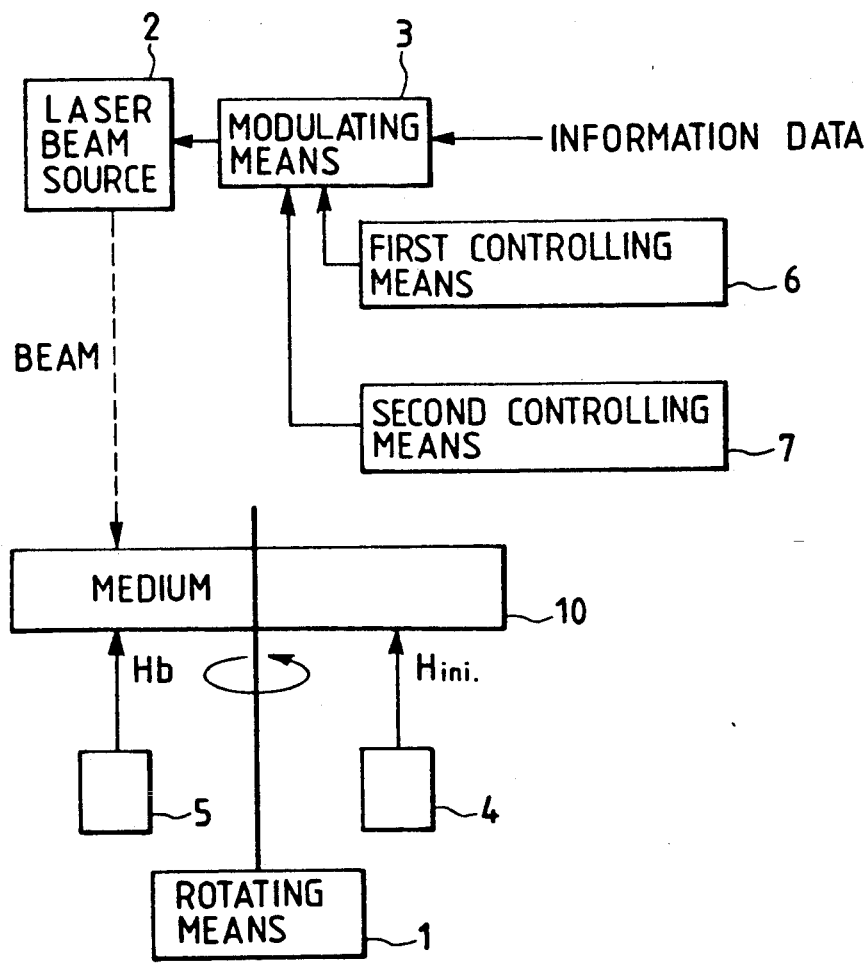
FIG. 38 is a block diagram showing an arrangement of a magnetooptical recording apparatus according to an embodiment of the present invention.

FIG. 38 is a schematic block diagram showing an arrangement of an over-write capable magnetooptical recording apparatus according to this embodiment.

The recording apparatus includes:

a rotating means 1 for rotating a magnetooptical recording medium at a constant angular velocity;

a laser beam source 2;

a modulating means 3 for modulating a laser beam intensity between high and low levels according to data on the basis of a bit position recording method;

an initial field applying means 4;

a bias field applying means 5;

a first controlling means 6 for making high-level beam intensity constant at both inner and outer portions of the medium, and increasing high-level emission time of the pulse at the inner portion of the medium and decreasing high-level emission time at the outer portion; and a second controlling means 7 for decreasing low-level beam intensity at the inner portion of the medium, and increasing low-level beam intensity at the outer portion.

Example 2

(1) A recording medium (disk) manufactured in Reference Example was prepared.

(2) The disk was rotated at a constant angular velocity (3,600 rpm) using the apparatus of Example 1.

(3) A high-level laser beam intensity was set to be constant, i.e., 16 mW. A low-level laser beam intensity was set to be 5 mW at the innermost portion (a radial position of 30 mm from the center), and was set to be 9 mW at the outermost portion (a radial position of 60 mm from the center). Between these positions, the low-level laser beam intensity was linearly increased from the inner portion toward the outer portion. In any case, a predetermined intensity value was radiated on the surface of the recording layer.

In first recording, data was a rectangular wave at a frequency of 5 MHz. At the innermost portion, a high-level emission time was set to be 50 nsec, ¼ an original value (a duty ratio of high level to low level = 1:3), and at the outermost portion, the high-level emission time was set to be 100 nsec as an original value (a duty ratio of high level to low level = 1:1). Between these positions, the high-level emission time was linearly increased from the inner portion toward the outer portion.

In second recording, data was a rectangular wave at a frequency of 7.4 MHz. At the innermost portion, the high-level emission time was set to be 34 nsec, ¼ an original value (a duty ratio of high level to low level = 1:3), and at the outermost portion, the high-level emission time was set to be 68 nsec as an original value (a duty ratio of high level to low level = 1:1). Between these positions, the high-level emission time was linearly increased from the inner portion toward the outer portion.

After the first recording was performed under the above-mentioned conditions, the recorded data was reproduced by a conventional magnetooptical reproduction apparatus. As a result, C/N ratio = 51 dB at the innermost portion, and C/N ratio = 54 dB at the outermost portion.

Thereafter, the second recording was performed, and the recorded data was similarly reproduced. When the C/N ratios were measured, C/N ratio = 47 dB at the innermost portion, and C/N ratio = 52 dB at the outermost portion. In addition, no previous data (5 MHz) was measured.

Comparative Example

The recording and reproduction were performed following substantially the same procedures as in Example 2 except that the low-level intensity at the innermost portion was set to be constant (5 mW). As a result, C/N ratio = 51 dB at the innermost portion, and C/N ratio = 54 dB at the outermost portion in the first recording/reproduction. In the second recording/reproduction, C/N ratio = 47 dB at the innermost portion, and C/N ratio = 40 dB at the outermost portion. During the second reproduction, the previous data (5 MHz) was measured at the outer portion. For this reason, C/N ratio was decreased.

Note that a method of increasing the emission time and the low-level intensity toward the outer portion includes a method of increasing it continuously (this embodiment) and a method of increasing it stepwise.

What is claimed is:

1. An over-write capable magnetooptical method of recording data by radiating a laser beam on a disk-like magnetooptical recording medium formed by stacking at least two magnetic layers each having a perpendicular magnetic anisotropy and pulse-modulating the laser beam intensity between high and low levels according to data to be recorded, and comprising the steps of:
- shortening high-level emission time of said laser beam at an inner portion of said medium and prolonging the high-level emission time at an outer portion of said medium while making the high-level intensity of the laser beam substantially constant at both the inner and outer portions of said medium; and
- decreasing the low-level intensity of the laser beam at the inner portion of said medium and increasing the low-level intensity at the outer portion of said medium.

2. A method according to claim 1, wherein the method is performed while the recording medium is rotated at substantially constant angular velocity.

3. A magnetooptical recording apparatus comprising:
(1) rotating means for rotating a disk-like magnetooptical recording medium at a constant angular velocity;
(2) a laser beam source;
(3) means for pulse-modulating the intensity of a laser beam from said source between high and low levels according to data to be recorded;
(4) initial field applying means;
(5) bias field applying means;
(6) first controlling means for causing the high-level emission time of said laser beam to be shortened at an inner portion of said medium and to be prolonged at an outer portion of said medium while making the high-level intensity of the laser beam substantially constant at both the inner and outer portions of said medium; and
(7) second controlling means for causing the low-level intensity of the laser beam to be decreased at the inner portion of said medium and to be increased at the outer portion of said medium.

4. An apparatus according to claim 2, wherein said initial field applying means and said bias field applying means constitute a single magnetic field applying means.

* * * * *